(12) United States Patent
Saito

(10) Patent No.: US 8,352,373 B2
(45) Date of Patent: Jan. 8, 2013

(54) DATA COPYRIGHT MANAGEMENT SYSTEM

(75) Inventor: Makoto Saito, Tokyo (JP)

(73) Assignee: Intarsia Software LLC, Las Vegas, NV (US)

( * ) Notice: Subject to any disclaimer, the term of this patent is extended or adjusted under 35 U.S.C. 154(b) by 308 days.

(21) Appl. No.: 10/352,078

(22) Filed: Jan. 28, 2003

(65) Prior Publication Data

US 2003/0144963 A1    Jul. 31, 2003

Related U.S. Application Data

(63) Continuation of application No. 09/476,334, filed on Jan. 3, 2000, which is a continuation of application No. 08/536,747, filed on Sep. 29, 1995, now Pat. No. 6,069,952.

(30) Foreign Application Priority Data

Sep. 30, 1994 (JP) ...................................... 6-237673
Oct. 27, 1994 (JP) ...................................... 6-264199
Nov. 2, 1994 (JP) ...................................... 6-269959

(51) Int. Cl.
*G06F 21/00* (2006.01)

(52) U.S. Cl. ............ 705/57; 705/51; 705/904; 705/911; 380/277; 380/278; 380/201; 713/150; 726/26; 726/27

(58) Field of Classification Search .................... 705/50, 705/51, 57, 5; 380/278, 279, 283; 713/165, 713/167, 171, 176, 180, 182, 191, 193
See application file for complete search history.

(56) References Cited

U.S. PATENT DOCUMENTS 4,104,721 A    8/1978   Markstein et al.
(Continued)

FOREIGN PATENT DOCUMENTS

DE           3717261        11/1987
(Continued)

OTHER PUBLICATIONS

RSA Laboratories, "2.1.3 What are the advantages and disadvantages of public-key cryptography compared with secret-key cryptography?", http://www.rsa.com/rsalabs/node.asp?id=2167#, third paragraph.*

(Continued)

*Primary Examiner* — Jacob C. Coppola

(57) ABSTRACT

A data copyright management system comprises a database for storing original data, a key control center for managing crypt keys, copyright management center for managing data copyrights, and a communication network for connecting these sections. Data supplied from the database to users is encrypted and distributed. The users decrypts the encrypted data by crypt keys obtained from the key control center or copyright management center. To supply data to users, there are the following two methods: a one-way supplying of encrypted data to users by means of broadcasting or the like; and two-way supplying of encrypted data to users corresponding to users' requests. A crypt key system used for encrypting data uses a secret-key cryptosystem, a public-key cryptosystem or a cryptosystem combining a secret-key and a public-key and further uses a copyright control program to control data copyrights. When a user stores, copies, or transfers data, the data is encrypted by a crypt key different from a crypt key used for supplying the data. The former crypt key is supplied from the key control center or from the copyright management center, or generated by the copyright control program. The present invention can be applied to a data copyright management system for using not only single data but also a plurality of data supplied from a single database or a plurality of data supplied from a plurality of databases. Further, an apparatus to be used by the user to perform data copyright management is proposed.

25 Claims, 10 Drawing Sheets

U.S. PATENT DOCUMENTS

| | | | |
|---|---|---|---|
| 4,168,396 A | 9/1979 | Best | |
| 4,225,884 A | 9/1980 | Block et al. | |
| 4,278,337 A | 7/1981 | Mashimo | |
| 4,278,837 A | 7/1981 | Best | |
| 4,352,952 A | 10/1982 | Boone et al. | |
| 4,386,233 A | 5/1983 | Smid et al. | |
| 4,408,203 A * | 10/1983 | Campbell | 705/71 |
| 4,423,287 A * | 12/1983 | Zeidler | 705/71 |
| 4,458,109 A | 7/1984 | Mueller-Schloer | |
| 4,465,901 A | 8/1984 | Best | |
| 4,500,750 A | 2/1985 | Elander et al. | |
| 4,527,195 A | 7/1985 | Cheung | |
| 4,536,647 A | 8/1985 | Atalla et al. | |
| 4,558,176 A | 12/1985 | Arnold et al. | |
| 4,567,512 A | 1/1986 | Abraham | |
| 4,578,530 A | 3/1986 | Zeidler | |
| 4,588,991 A * | 5/1986 | Atalla | 713/165 |
| 4,613,901 A | 9/1986 | Gilhousen et al. | |
| 4,623,918 A | 11/1986 | Chomet | |
| 4,709,266 A | 11/1987 | Hanas et al. | |
| 4,710,955 A | 12/1987 | Kauffman | |
| 4,736,422 A | 4/1988 | Mason | |
| 4,751,732 A | 6/1988 | Kamitake | |
| 4,757,534 A | 7/1988 | Matyas et al. | |
| 4,759,062 A | 7/1988 | Traub et al. | |
| 4,791,565 A | 12/1988 | Dunham et al. | |
| 4,796,220 A | 1/1989 | Wolfe | |
| 4,799,156 A | 1/1989 | Shavit et al. | |
| 4,817,140 A | 3/1989 | Chandra et al. | |
| 4,827,508 A | 5/1989 | Shear | |
| 4,829,569 A | 5/1989 | Seth-Smith et al. | |
| 4,850,017 A | 7/1989 | Matyas et al. | |
| 4,852,154 A | 7/1989 | Lewis et al. | |
| 4,862,268 A | 8/1989 | Campbell et al. | |
| 4,864,494 A | 9/1989 | Kobus, Jr. | |
| 4,864,614 A | 9/1989 | Crowther | |
| 4,864,615 A | 9/1989 | Bennett et al. | |
| 4,866,707 A * | 9/1989 | Marshall et al. | 714/749 |
| 4,890,319 A | 12/1989 | Seth-Smith et al. | |
| 4,890,321 A | 12/1989 | Seth-Smith et al. | |
| 4,905,277 A | 2/1990 | Nakamura | |
| RE33,189 E | 3/1990 | Lee et al. | |
| 4,916,737 A | 4/1990 | Chomet et al. | |
| 4,919,545 A | 4/1990 | Yu | |
| 4,933,969 A * | 6/1990 | Marshall et al. | 713/177 |
| 4,941,176 A | 7/1990 | Matyas et al. | |
| 4,965,568 A * | 10/1990 | Atalla et al. | 340/5.85 |
| 4,977,594 A | 12/1990 | Shear | |
| 4,995,080 A | 2/1991 | Bestler et al. | |
| 5,005,200 A | 4/1991 | Fischer | |
| 5,007,082 A * | 4/1991 | Cummins | 713/164 |
| 5,008,853 A | 4/1991 | Bly et al. | |
| 5,008,936 A * | 4/1991 | Hamilton et al. | 380/281 |
| 5,010,571 A * | 4/1991 | Katznelson | 705/53 |
| 5,029,207 A | 7/1991 | Gammie | |
| 5,034,980 A | 7/1991 | Kubota | |
| 5,036,461 A | 7/1991 | Elliott et al. | |
| 5,046,093 A | 9/1991 | Wachob | |
| 5,054,064 A * | 10/1991 | Walker et al. | 380/239 |
| 5,060,262 A | 10/1991 | Bevins, Jr et al. | |
| 5,077,665 A | 12/1991 | Silverman et al. | |
| 5,083,309 A | 1/1992 | Beysson | |
| 5,091,938 A | 2/1992 | Thompson et al. | |
| 5,103,476 A | 4/1992 | Waite et al. | |
| 5,113,518 A | 5/1992 | Durst, Jr. et al. | |
| 5,124,117 A | 6/1992 | Tatebayashi et al. | |
| 5,126,566 A | 6/1992 | Shimada | |
| 5,138,659 A | 8/1992 | Kelkar et al. | |
| 5,142,579 A | 8/1992 | Anderson | |
| 5,144,663 A | 9/1992 | Kudelski et al. | |
| 5,146,497 A | 9/1992 | Bright | |
| 5,157,726 A | 10/1992 | Merkle et al. | |
| 5,163,096 A | 11/1992 | Clark et al. | |
| 5,173,939 A | 12/1992 | Abadi et al. | |
| 5,175,416 A | 12/1992 | Mansvelt et al. | |
| 5,191,611 A * | 3/1993 | Lang | 705/53 |
| 5,196,840 A | 3/1993 | Leith et al. | |
| 5,200,999 A * | 4/1993 | Matyas et al. | 380/277 |
| 5,201,000 A * | 4/1993 | Matyas et al. | 380/30 |
| 5,204,961 A | 4/1993 | Barlow | |
| 5,220,604 A | 6/1993 | Gasser et al. | |
| 5,222,137 A * | 6/1993 | Barrett et al. | 380/271 |
| 5,224,163 A * | 6/1993 | Gasser et al. | 380/30 |
| 5,227,893 A | 7/1993 | Ett | |
| 5,235,641 A | 8/1993 | Nozawa et al. | |
| 5,247,575 A * | 9/1993 | Sprague et al. | 705/53 |
| 5,253,294 A | 10/1993 | Maurer | |
| 5,270,773 A | 12/1993 | Sklut et al. | |
| 5,291,598 A | 3/1994 | Grundy | |
| 5,293,422 A | 3/1994 | Loiacono | |
| 5,301,245 A | 4/1994 | Endoh | |
| 5,313,521 A | 5/1994 | Torii et al. | |
| 5,315,657 A | 5/1994 | Abadi et al. | |
| 5,319,705 A | 6/1994 | Halter et al. | |
| 5,319,710 A | 6/1994 | Atalla et al. | |
| 5,323,464 A | 6/1994 | Elander et al. | |
| 5,341,425 A | 8/1994 | Wasilewski et al. | |
| 5,343,527 A | 8/1994 | Moore | |
| 5,345,508 A | 9/1994 | Lynn et al. | |
| 5,347,581 A | 9/1994 | Naccache et al. | |
| 5,349,662 A | 9/1994 | Johnson et al. | |
| 5,353,351 A | 10/1994 | Bartoli et al. | |
| 5,355,414 A | 10/1994 | Hale et al. | |
| 5,361,091 A | 11/1994 | Hoarty et al. | |
| 5,369,702 A | 11/1994 | Shanton | |
| 5,371,794 A | 12/1994 | Diffie et al. | |
| 5,371,797 A * | 12/1994 | Bocinsky, Jr. | 705/70 |
| 5,375,240 A | 12/1994 | Grundy | |
| 5,381,480 A * | 1/1995 | Butter et al. | 380/37 |
| 5,390,297 A | 2/1995 | Barber et al. | |
| 5,392,351 A | 2/1995 | Hasebe et al. | |
| 5,400,403 A * | 3/1995 | Fahn et al. | 705/51 |
| 5,402,492 A | 3/1995 | Goodman et al. | |
| 5,410,602 A | 4/1995 | Finkelstein et al. | |
| 5,414,772 A | 5/1995 | Naccache et al. | |
| 5,418,853 A * | 5/1995 | Kanota et al. | 705/58 |
| 5,428,606 A | 6/1995 | Moskowitz | |
| 5,428,685 A | 6/1995 | Kadooka | |
| 5,438,508 A | 8/1995 | Wyman | |
| 5,442,541 A | 8/1995 | Hube et al. | |
| 5,442,706 A * | 8/1995 | Kung | 380/30 |
| 5,444,779 A | 8/1995 | Daniele et al. | |
| 5,444,782 A | 8/1995 | Adams, Jr. et al. | |
| 5,450,493 A | 9/1995 | Maher | |
| 5,453,601 A | 9/1995 | Rosen | |
| 5,455,863 A | 10/1995 | Brown et al. | |
| 5,455,941 A | 10/1995 | Okuno et al. | |
| 5,457,746 A * | 10/1995 | Dolphin | 705/51 |
| 5,465,299 A | 11/1995 | Matsumoto et al. | |
| 5,475,757 A | 12/1995 | Kelly | |
| 5,475,758 A | 12/1995 | Kikuchi | |
| 5,479,514 A * | 12/1995 | Klonowski | 380/47 |
| 5,483,598 A | 1/1996 | Kaufman et al. | |
| 5,485,577 A | 1/1996 | Eyer et al. | |
| 5,490,216 A | 2/1996 | Richardson, III | |
| 5,495,533 A | 2/1996 | Linehan et al. | |
| 5,497,420 A | 3/1996 | Garneau et al. | |
| 5,497,479 A | 3/1996 | Hornbuckle | |
| 5,499,298 A | 3/1996 | Narasimhalu et al. | |
| 5,499,340 A | 3/1996 | Barritz | |
| 5,504,816 A * | 4/1996 | Hamilton et al. | 380/217 |
| 5,504,817 A | 4/1996 | Shamir | |
| 5,504,818 A | 4/1996 | Okano | |
| 5,504,933 A | 4/1996 | Saito | |
| 5,509,073 A | 4/1996 | Monnin | |
| 5,509,074 A * | 4/1996 | Choudhury et al. | 713/176 |
| 5,511,121 A | 4/1996 | Yacobi | |
| 5,513,260 A * | 4/1996 | Ryan | 380/200 |
| 5,515,441 A | 5/1996 | Faucher | |
| 5,515,538 A | 5/1996 | Kleiman | |
| 5,517,014 A | 5/1996 | Iijima | |
| 5,530,752 A | 6/1996 | Rubin | |
| 5,532,920 A | 7/1996 | Hartrick et al. | |
| 5,535,383 A | 7/1996 | Gower | |
| 5,541,994 A | 7/1996 | Tomko et al. | |
| 5,553,143 A | 9/1996 | Ross et al. | |
| 5,553,145 A | 9/1996 | Micali | |

| | | | | | | |
|---|---|---|---|---|---|---|
| 5,553,281 | A | 9/1996 | Brown et al. | 6,519,623 B1 | 2/2003 | Mancisidor |
| 5,557,346 | A | 9/1996 | Lipner et al. | 6,560,339 B1 | 5/2003 | Iwamura |
| 5,574,787 | A * | 11/1996 | Ryan .............................. 380/201 | 6,574,609 B1 | 6/2003 | Downs et al. |
| 5,577,121 | A | 11/1996 | Davis et al. | 6,603,864 B1 | 8/2003 | Matsunoshita |
| 5,579,223 | A | 11/1996 | Raman | 6,615,258 B1 | 9/2003 | Barry et al. |
| 5,581,682 | A | 12/1996 | Anderson et al. | 6,668,324 B1 | 12/2003 | Mangold et al. |
| 5,584,023 | A | 12/1996 | Hsu | 6,721,887 B2 | 4/2004 | Saito |
| 5,586,036 | A | 12/1996 | Pintsov | 6,741,991 B2 | 5/2004 | Saito |
| 5,586,301 | A | 12/1996 | Fisherman et al. | 6,744,894 B1 | 6/2004 | Saito |
| 5,604,800 | A | 2/1997 | Johnson et al. | 6,789,197 B1 | 9/2004 | Saito |
| 5,606,609 | A | 2/1997 | Houser et al. | 6,851,053 B1 | 2/2005 | Liles et al. |
| 5,606,613 | A | 2/1997 | Lee | 6,874,089 B2 | 3/2005 | Dick et al. |
| 5,607,411 | A | 3/1997 | Heironimus et al. | 6,912,284 B1 | 6/2005 | Palmatier |
| 5,633,934 | A | 5/1997 | Hember | 7,024,681 B1 | 4/2006 | Fransman et al. |
| 5,636,277 | A | 6/1997 | Nagahama | 7,036,019 B1 | 4/2006 | Saito |
| 5,642,418 | A | 6/1997 | Farris et al. | 7,093,295 B1 | 8/2006 | Saito |
| 5,646,992 | A | 7/1997 | Subler et al. | 7,302,415 B1 | 11/2007 | Saito |
| 5,646,997 | A | 7/1997 | Barton | 7,337,323 B2 | 2/2008 | Cochran et al. |
| 5,646,999 | A | 7/1997 | Saito | 7,363,434 B2 | 4/2008 | Polyudov |
| 5,649,099 | A | 7/1997 | Theimer et al. | 7,461,249 B1 | 12/2008 | Pearson et al. |
| 5,651,064 | A | 7/1997 | Newell | 7,484,095 B2 | 1/2009 | de Jong |
| 5,666,411 | A | 9/1997 | McCarty | 7,500,093 B2 | 3/2009 | Makita |
| 5,680,452 | A | 10/1997 | Shanton | 7,711,152 B1 | 5/2010 | Davida et al. |
| 5,689,587 | A | 11/1997 | Bender | 7,730,323 B2 | 6/2010 | Saito |
| 5,706,210 | A | 1/1998 | Kumano et al. | 2002/0021807 A1 | 2/2002 | Saito |
| 5,715,393 | A | 2/1998 | Naugle | 2002/0052850 A1 | 5/2002 | Saito |
| 5,719,938 | A * | 2/1998 | Haas et al. ...................... 705/52 | 2002/0112173 A1 | 8/2002 | Saito |
| 5,740,246 | A | 4/1998 | Saito | 2003/0144963 A1 | 7/2003 | Saito |
| 5,745,572 | A | 4/1998 | Press | 2005/0262023 A1 | 11/2005 | Saito |
| 5,765,152 | A | 6/1998 | Erickson et al. | | | |
| 5,765,176 | A | 6/1998 | Bloomberg | FOREIGN PATENT DOCUMENTS | | |
| 5,771,383 | A | 6/1998 | Magee et al. | EP | 0121853 | 10/1984 |
| 5,794,115 | A | 8/1998 | Saito | EP | 158167 | 10/1985 |
| 5,805,706 | A | 9/1998 | Davis | EP | 0199410 | 10/1986 |
| 5,812,762 | A | 9/1998 | Kim | EP | 0225010 | 6/1987 |
| 5,818,933 | A | 10/1998 | Kambe et al. | EP | 0341801 | 11/1989 |
| 5,825,892 | A | 10/1998 | Braudaway | EP | 0391261 A3 | 3/1990 |
| 5,832,083 | A | 11/1998 | Iwayama et al. | EP | 0459046 | 12/1991 |
| 5,835,601 | A | 11/1998 | Shimbo et al. | EP | 0542298 A3 | 11/1992 |
| 5,835,765 | A | 11/1998 | Matsumoto | EP | 0518365 A2 | 12/1992 |
| 5,841,865 | A | 11/1998 | Sudia | EP | 0191162 B1 | 2/1993 |
| 5,841,886 | A | 11/1998 | Rhoads | EP | 0532381 | 3/1993 |
| 5,848,155 | A | 12/1998 | Cox | EP | 0551016 | 7/1993 |
| 5,848,158 | A | 12/1998 | Saito | EP | 0561685 | 9/1993 |
| 5,864,683 | A | 1/1999 | Boebert et al. | EP | 0590763 | 4/1994 |
| 5,867,579 | A | 2/1999 | Saito | EP | 0421808 B1 | 12/1994 |
| 5,872,849 | A | 2/1999 | Sudia | EP | 0649074 | 4/1995 |
| 5,889,868 | A | 3/1999 | Moskowitz | EP | 0 665 486 A2 | 8/1995 |
| 5,901,339 | A | 5/1999 | Saito | EP | 0430734 B1 | 9/1995 |
| 5,910,987 | A * | 6/1999 | Ginter et al. .................... 705/52 | EP | 0 704 785 B1 | 4/1996 |
| 5,912,969 | A | 6/1999 | Sasamoto et al. | EP | 0354774 B1 | 4/1996 |
| 5,933,497 | A | 8/1999 | Beetcher et al. | EP | 0 709 760 A2 | 5/1996 |
| 5,968,175 | A | 10/1999 | Morishita et al. | EP | 0715243 | 6/1996 |
| 5,974,141 | A | 10/1999 | Saito | EP | 0450841 B1 | 8/1996 |
| 5,982,891 | A | 11/1999 | Ginter | EP | 0506435 B1 | 10/1996 |
| 5,986,690 | A | 11/1999 | Hendricks | EP | 0489385 B1 | 3/1997 |
| 6,002,772 | A | 12/1999 | Saito | EP | 0438154 B1 | 7/1997 |
| 6,006,328 | A | 12/1999 | Drake | EP | 0398645 B1 | 8/1997 |
| 6,009,177 | A | 12/1999 | Sudia | EP | 0813133 A2 | 12/1997 |
| 6,026,430 | A | 2/2000 | Butman et al. | EP | 0677949 B1 | 5/2003 |
| 6,044,367 | A | 3/2000 | Wolff | EP | 0719045 B1 | 10/2003 |
| 6,069,952 | A | 5/2000 | Saito et al. | EP | 0715241 B1 | 1/2004 |
| 6,076,077 | A | 6/2000 | Saito | EP | 0746126 B1 | 12/2004 |
| 6,081,794 | A | 6/2000 | Saito et al. | EP | 0581227 B1 | 9/2005 |
| 6,091,835 | A | 7/2000 | Smithies et al. | GB | 2231244 | 11/1990 |
| 6,097,816 | A | 8/2000 | Saito et al. | JP | 58169000 | 10/1983 |
| 6,097,818 | A | 8/2000 | Saito | JP | 59169000 | 9/1984 |
| 6,128,605 | A | 10/2000 | Saito et al. | JP | 60102038 | 6/1985 |
| 6,160,891 | A | 12/2000 | Al-Salqan | JP | 62-169540 | 7/1987 |
| 6,182,218 | B1 | 1/2001 | Saito | JP | 64-041387 | 2/1989 |
| 6,209,092 | B1 | 3/2001 | Linnartz | JP | 01048165 | 2/1989 |
| 6,226,618 | B1 | 5/2001 | Downs et al. | JP | 64-061782 | 3/1989 |
| 6,272,635 | B1 | 8/2001 | Saito | JP | 03-128541 | 5/1991 |
| 6,408,390 | B1 | 6/2002 | Saito | JP | 03-162152 | 7/1991 |
| 6,415,271 | B1 | 7/2002 | Turk et al. | JP | 03-265241 | 11/1991 |
| 6,424,715 | B1 | 7/2002 | Saito | JP | 03-282989 | 12/1991 |
| 6,438,694 | B2 | 8/2002 | Saito | JP | 04003224 | 1/1992 |
| 6,449,717 | B1 | 9/2002 | Saito | JP | 7302244 | 1/1992 |
| 6,463,536 | B2 | 10/2002 | Saito | JP | 4-181282 | 6/1992 |

| | | |
|---|---|---|
| JP | 04-181282 | 6/1992 |
| JP | 04-268844 | 9/1992 |
| JP | 05-056037 | 3/1993 |
| JP | 05-063142 | 3/1993 |
| JP | 5-63142 | 3/1993 |
| JP | 5075597 | 3/1993 |
| JP | 64061782 | 3/1993 |
| JP | 05-122701 | 8/1993 |
| JP | 5-276476 | 10/1993 |
| JP | 05-298373 | 11/1993 |
| JP | 5316102 | 11/1993 |
| JP | 05-327693 | 12/1993 |
| JP | 5-334324 | 12/1993 |
| JP | 05-334324 | 12/1993 |
| JP | 5324936 | 12/1993 |
| JP | 15327693 | 12/1993 |
| JP | 06-037750 | 2/1994 |
| JP | 06-046419 | 2/1994 |
| JP | 06-095591 | 4/1994 |
| JP | 06-131806 | 5/1994 |
| JP | 06-152587 | 5/1994 |
| JP | 06-162059 | 6/1994 |
| JP | 6231536 | 8/1994 |
| JP | 6236147 | 8/1994 |
| JP | 06-264201 | 9/1994 |
| JP | 6242304 | 9/1994 |
| JP | 6264199 | 9/1994 |
| JP | 6264201 | 9/1994 |
| JP | 6269959 | 9/1994 |
| JP | 6290087 | 10/1994 |
| JP | 6318036 | 11/1994 |
| JP | 7014045 | 1/1995 |
| JP | 7271865 | 10/1995 |
| JP | 8185448 | 7/1996 |
| JP | 2546983 | 10/1996 |
| JP | 08-287014 | 11/1996 |
| JP | 8292976 | 11/1996 |
| WO | WO8503830 | 8/1985 |
| WO | WO8909528 | 10/1989 |
| WO | WO 9002382 | 3/1990 |
| WO | 91/16691 | 10/1991 |
| WO | 9211598 | 7/1992 |
| WO | WO9307715 | 4/1993 |
| WO | WO9520291 | 7/1995 |
| WO | WO9613113 | 5/1996 |
| WO | WO9623257 | 8/1996 |
| WO | WO9627259 | 9/1996 |
| WO | WO9750036 | 12/1997 |

OTHER PUBLICATIONS

X5 Networks, "What are the Advantages and Disadvantages of Public-Key Cryptography Compared with Secret-Key Cryptography?", http://x5.net/faqs/crypto/q4.html, third paragraph.*
Notice of Rejection mailed Oct. 15, 2002 from the Japanese Patent Office in related Application No. 7-228366 and partial translation thereof.
Japanese Patent Laid-Open Publication No. 5-334324.
Notice of Reason for Rejection in corresponding Japanese Patent Application No. 7-228366 dated Jul. 15, 2003 and translation.
Seki, et al., "Proposal for a New Software Distribution Mode Utilizing Encryption," Research Report (Information System and Social Environment).
Japan, Jul. 20, 1993, No. 45, p. 19-28.
Gale, B. and Baylin, F., Scrambling and Descrambling, Satellite and Cable TV 2nd Ed, Baylin/Gale Productions 1986 Boulder CO; pp. 163-165.
Medvinsky, et al. Net Cash: A Design for Practical Erectrical Currency on the Internet, ISI Reprint Series, Nov. 1993, pp. 2-7.
Newman, Proceedings of the 13th International Confernece on Distributed Computing Systems, May 1993, pp. 283-291.
Notice of Final Decision of Rejection, Japan Patent Office, Dispatch No. 398991, Nov. 11, 2003.
Notice of Rejection mailed Oct. 15, 2002 from the Japanese Patent Office in related Application 7-228366.
Ham, Leln, et al., "Software Authentication System for Information Integrity," Computers & Security International Journal Devoted to the Study of Technical and Financial Aspects of Computer Security, vol. 11, Dec. 1, 1992, pp. 747-752, XP000332279.
Kazunori Seki, et al., "A Proposal of a New Distribution Scheme for Software Products", Research Report of Information Processing Association Japan, Jul. 20, 1993, vol. 93, No. 64, pp. 19-28.
Tatsuaki Okamoto, "Universal Electronic Cash"; Technical Report of Institute of Electronics, Information and Communication Engineers (IEICE) Jul. 15, 1991, vol. 91, No. 127, pp. 39-47.
U.S. Appl. No. 11/556,992, fied Nov. 6, 2006, Saito.
U.S. Appl. No. 11/469,035, filed Aug. 31, 2006, Saito.
U.S. Appl. No. 11/512,885, filed Aug. 29, 2006, Saito.
U.S. Appl. No. 11/512,695, filed Aug. 29, 2006, Saito.
U.S. Appl. No. 11/496,777, filed Jul. 31, 2006, Saito.
U.S. Appl. No. 11/491,400, filed Jul. 20, 2006, Saito.
U.S. Appl. No. 11/480,690, filed Jul. 3, 2006, Saito.
U.S. Appl. No. 11/446,604, filed Jun. 1, 2006, Saito.
U.S. Appl. No. 11/441,973, filed May 25, 2006, Saito.
U.S. Appl. No. 11/404,124, filed Apr. 12, 2006, Saito.
Memon, Nasir, et al., "Protecting Digital Media Content" Association for Computing Machinery, Communications of the ACM, New York, Jul. 1998, vol. 41, issue 7, pp. 35-43.
Murphy, Kathleen, "Digimarc Awarded Patent for Digital Watermarking" Business, Mar. 10, 1998, www.internetnews.com/bus-news/article.php/19611, 2 pgs.
Hedberg, S.R. "HP's International Cryptography Framework: Compromise or Threat?" IEEE Computer, Jan. 1997, pp. 28-30.
U.S. Appl. No. 11/190,177, filed Jul. 25, 2005, Saito.
Zhang, N. X. "Secure Code Distribution" IEEE Computer, Jun. 1997, pp. 76-79.
Anonymous, "Security" Government Executive, National Journal, Inc. Washington, vol. 29, issue 1, Jan. 1997, pp. 35-37.
Wayner, P. "Digital Copyright Protection" AP Professional, 1997, pp. 1-7 and 14-17.
Menezes, Alfred, et al., "Handbook of Applied Cryptography" 1997, sec. 11.5.1, CRC Press, pp. 452-454.
Fitch, K. "User Authentication and Software Distribution on the Web", ausweb97@scu.edu.au Nov. 5, 1996, pp. 1-12.
Rubin, A.D., "Trusted Distribution of Software Over the Internet" Network and Distributed System Security, Feb. 16-17, 1995, San Diego, California, pp. 47-53.
U.S. Appl. No. 10/170,677, filed Jun. 13, 2002, Saito.
U.S. Appl. No. 10/013,507, filed Dec. 13, 2001, Saito.
U.S. Appl. No. 09/985,279, filed Nov. 2, 2001, Saito.
Bryan, John "A look at five different firewall products and services you can install today" www.byte.com/art/9504/sec10/art6.htm, Apr. 1995.
Rubin, A.D., "Secure Distribution of Electronic Documents in an Hostile Environment" Computer Communications, vol. 18, No. 6, Jun. 1995, pp. 429-434.
Bellovin, S.M. et al., "Network Firewalls" IEEE Communications Magazine, vol. 32, No. 9, Oct. 1994, pp. 50-57.
U.S. Appl. No. 09/665,902, filed Sep. 20, 2000, Saito.
U.S. Appl. No. 09/476,334, filed Jan. 30, 2000, Saito.
Rozenblit, M. "Secure Software Distribution" IEEE Network Operations and Management Symposium, vol. 2, Feb. 14-18, 1994, pp. 486-496.
Van Schyndel, R.G., et al., "A Digital Watermark" IEEE, Australia, 1994, pp. 86-90.
Lennil, P. "The IBM Microkernel Technology," OS/2 Developer, vol. 5, Nov. 1, 1993 (pp. 70-72, 74) XP000672962.
U.S. Appl. No. 09/362,955, filed Jul. 30, 1999, Saito.
Vigarie, J. "A Device for Real-Time Modification of . . . " 18th International Television Symposium and Technical Exhibition, Montreaux, Switzerland, Jun. 10-15, 1993, pp. 761-768.
Anonymous, "Encryption of Information to be Recorded so as to Prevent Unauthorized Playback" Research Disclosure No. 335, Mar. 1992, Emsworth, GB, p. 219.
Masuoka, Fujio, Progressing Flash Memories Kogyo Chosa-kai Co., Chapter 1: Semiconductor Memory, pp. 34-68.
Komatsu, Naohisa, et al., "A Proposal on Digital Watermark in Document Image Communication and its Application to Realizing a Signature" Electronics & Communications in Japan Part I—Communications, vol. 73, No. 5, part 1, May 1, 1990, pp. 22-33.

Matsumoto, Tsutomu et al., "Cryptographic Key Sharing" Technical Report of Institute of Electronics, Information and Communication Engineers (IEICE), Mar. 27, 1990, vol. 89, No. 482, pp. 33-47.
Morizaki, H., "Introduction to Electronic Devices" Gijustsu Hyoron Publishing Co., 1989, pp. 260-266.
U.S. Appl. No. 08/895,493, filed Jul. 16, 1997, Saito.
U.S. Appl. No. 08/846,661, filed May 1, 1997, Saito.
Grampp, F.T. et al., "Unix Operating System Security" AT&T Bell Laboratories Technical Journal, vol. 63, No. 8, Oct. 1984, New York, pp. 1649-1672.
Adachi, R., "Introduction to handcraft of Personal Computer" Natsume Publishing Co., 1983, pp. 141-155.
"Des Modes of Operation" U.S. FIPS Publication 81, Dec. 2, 1980, 23 pgs.
U.S. Appl. No. 08/733,504, filed Oct. 18, 1996, Saito.
"Internet Privacy Enhanced Mail", Association for Computing Machinery, Communications of the ACM, Aug. 1993, vol. 36, issue 9, pp. 48-61.
Tirkel, A.Z. et al., "Electronic Water Mark", Conference Proceedings Dicta, Dec. 1993, pp. 666-673.
U.S. Appl. No. 11/701,943, filed Feb. 1, 2007, Saito.
U.S. Appl. No. 11/701,945, filed Feb. 1, 2007, Saito.
U.S. Appl. No. 11/701,946, filed Feb. 1, 2007, Saito.
Office Action for Japanese Patent Application No. 7-280984, mailed Jan. 20, 2004.
U.S. Appl. No. 08/549,270, filed Oct. 27, 1995.
Notice of Rejection Japanese Patent Application No. 7-228366, mailed Jul. 15, 2003.
Interference Initial Memorandum; U.S. Appl. No. 09/097,877.
Official Action in U.S. Appl. No. 11/512,695 issued May 26, 2011, 34 pages.
Non-Final Office Action; U.S. Appl. No. 11/469,035; Mailed Jun. 11, 2008.
Search Report dated Oct. 24, 2002.
Non-Final Office Action; U.S. Appl. No. 10/105,262; Mailed Jan. 31, 2008.
Response to Office Action; U.S. Appl. No. 10/105,262, filed Apr. 30, 2008.
Non-Final Office Action; U.S. Appl. No. 09/985,279; Mailed Mar. 26, 2008.
Response to Office Action Mailed Aug. 23, 2007; U.S. Appl. No. 11/469,035, filed Feb. 22, 2008.
Response to Office Action Mailed Oct. 18, 2007; U.S. Appl. No. 11/556,992, filed Mar. 18, 2008.
Final Office Action; U.S. Appl. No. 11/556,992; Mailed Jun. 25, 2008.
Office Action dated Apr. 27, 2007, in U.S. Appl. No. 10/105,262, 9 pages.
Response to Office Action Mailed Apr. 27, 2007, in U.S. Appl. No. 10/105,262, pp. 1-12.
Official Action in Japanese Patent Application No. 2007-260256 dated Sep. 7, 2009, 8 pages; English Translation Available.
Response to Official Action issued in U.S. Appl. No. 11/469,035 dated Jun. 11, 2008, 18 pages filed Sep. 11, 2008.
Official Action issued in U.S. Appl. No. 11/469,035 dated Dec. 12, 2008, 7 pages.
Response to Official Action issued in U.S. Appl. No. 11/469,035 dated Dec. 12, 2008, 19 pages filed Feb. 12, 2009.
Response to Official Action issued in U.S. Appl. No. 11/556,992 dated Jun. 25, 2008, 12 pages filed Aug. 25, 2008.
Official Action issued in U.S. Appl. No. 11/556,992 dated Sep. 15, 2008, 8 pages.
Response to Official Action issued in U.S. Appl. No. 11/556,992 dated Sep. 15, 2008, 13 pages filed Dec. 15, 2008.
Response to Official Action issued in U.S. Appl. No. 09/985,279 dated Mar. 26, 2008, 18 pages filed Jul. 28, 2008.
Official Action issued in U.S. Appl. No. 09/985,279 dated Oct. 21, 2008, 18 pages.
Response to Official Action issued in U.S. Appl. No. 09/985,279 dated Oct. 21, 2008, 18 pages filed Feb. 23, 2009.
Intention to Grant issued in European Application No. 06014712.1 on Dec. 17, 2008, 38 pages.

Notice of Allowance in U.S. Appl. No. 11/512,885 issued Feb. 23, 2011, 13 pages.
Official Action in U.S. Appl. No. 11/496,777 issued Mar. 17, 2011, 12 pages.
Notice of Allowance in U.S. Appl. No. 11/469,035 issued Mar. 1, 2011, 6 pages.
Notice of Inquiry from the Appeal Board in Japanese Application No. 2006-198703 issued Jan. 19, 2011, 3 pages. English Translation Available.
Official Action in Japanese Application No. 2007-260256 issued Oct. 13, 2010, 3 pages. English Summary Available.
Official Action in Japanese Application No. 2007-260256 dated Jan. 6, 2009, 3 pages. English Translation Available, 3 pages.
Official Action in Japanese Application No. 2006-198703 dated Jan. 4, 2010, 7 pages. English Translation Available, 6 pages.
Official Action in Japanese Application No. 2006-198703 dated Jun. 4, 2010, 2 pages. English Translation Available, 3 pages.
Official Action in European Application No. 06014713.9 issued Oct. 21, 2010, 6 pages.
Official Action in Japanese Application No. 2002-364160 dated Jun. 15, 2009, 4 pages. English Translation Available, 5 pages.
Notification of Inquiry in Japanese Application No. 2002-364160 dated Nov. 18, 2008, 3 pages. English Translation Available, 3 pages.
Official Action in Japanese Application No. 2002-364160 dated Dec. 21, 2009, 4 pages. English Translation Available.
European Search Report for European Application No. 95115068 dated Jun. 30, 1999, 2 pages.
European Search Report for European Application No. 95116615.6 dated Dec. 1, 1998, 2 pages.
Official Action in Japanese Application No. 2004-149423 dated Oct. 30, 2007, 2 pages. English Translation Available, 2 pages.
Office Action for Japanese Patent Application No. 7-280984, issued Jan. 20, 2004, 4 pages. English Translation Available, 6 pages.
Official Action in U.S. Appl. No. 11/496,777 issued Aug. 24, 2010, 15 pages.
Official Action in U.S. Appl. No. 11/441,973 issued Dec. 30, 2009, 12 pages.
Official Action in U.S. Appl. No. 11/441,973 issued Jun. 25, 2010, 18 pages.
Official Action in U.S. Appl. No. 09/362,955, issued Aug. 3, 2007, 29 pages.
Official Action in U.S. Appl. No. 11/512,695 issued Oct. 15, 2009, 6 pages.
Official Action in U.S. Appl. No. 11/512,695 issued Apr. 16, 2010, 18 pages.
Official Action in U.S. Appl. No. 11/512,695 issued Nov. 18, 2010, 30 pages.
Official Action in U.S. Appl. No. 10/105,262 issued Aug. 8, 2008, 16 pages.
Official Action in U.S. Appl. No. 10/105,262 issued Jan. 31, 2008, 10 pages.
Advisory Action in U.S. Appl. No. 10/105,262 issued Oct. 21, 2008, 3 pages.
Appeal Brief in U.S. Appl. No. 10/105,262 issued Apr. 6, 2009, 58 pages.
Examiner's Answer to Appeal Brief in U.S. Appl. No. 10/105,262 issued Aug. 20, 2009, 21 pages.
Official Action in U.S. Appl. No. 11/512,885 issued Dec. 4, 2009, 7 pages.
Official Action in U.S. Appl. No. 11/512,885 issued Jun. 9, 2010, 20 pages.
Official Action in U.S. Appl. No. 11/469,035 issued Sep. 7, 2010, 8 pages.
Official Action in U.S. Appl. No. 11/469,035 issued Mar. 10, 2010, 7 pages.
Official Action in U.S. Appl. No. 11/469,035 issued Jul. 23, 2009, 6 pages.

Official Action in U.S. Appl. No. 11/469,035 issued Dec. 12, 2008, 7 pages.
Official Action in U.S. Appl. No. 11/469,035 issued Jun. 11, 2008, 7 pages.

Office Action in European Application No. 06014713.9 issued Jun. 28, 2012, 6 pages.

* cited by examiner

DATA COPYRIGHT MANAGEMENT SYSTEM

This application is a Continuation of prior application Ser. No. 09/476,334, filed Jan. 3, 2000, which is a Continuation of prior application Ser. No. 08/536,747 filed Sep. 29, 1995 now U.S. Pat. No. 6,069,952.

BACKGROUND OF THE INVENTION

1. Field of the Invention

The present invention relates to a system for managing copyrights for using, storing, copying, editing, or transferring digital data, particularly in multimedia applications.

2. Background Art

In the information-oriented society of today, database systems are becoming wide spread in which it is possible to use various types of data, stored independently in each computer in the past, by connecting computers via communication lines.

In such a database system, the information handled up to this point has been conventionally coded information that can be processed by a computer, and that contains a relatively small amount of information and monochrome binary data, such as facsimile information at most. It is not possible to handle data containing a relatively large amount of information, such as data for natural pictures or animation.

With the rapid progress of digital processing technique for various electric signals, a technique is under development for digital processing of picture signals other than binary data, handled only as analog signals in the past.

By digitizing the picture signal, it is possible to handle a picture signal, e.g., a television signal, by a computer. "Multimedia systems" is an emerging technology of the future capable of simultaneously handling the data handled by computers and digitized picture data.

Because picture data contains an overwhelmingly large amount of information compared with character data and audio data, it is difficult to store or transfer or process the picture data by computer. For this reason, techniques for compressing or expanding picture data have been developed. Further, several standards for compression/expansion of picture data have been established. For example, the following standards have been established as common standards: JPEG (Joint Photographic image coding Experts Group) standards for still pictures, H.261 standards for video conferences, MPEG1 (Moving Picture image coding Experts Group 1) standards for picture accumulation, and MPEG2 standards for current television broadcasting and high definition television broadcasting. By using these new techniques, it is now possible to transmit digital picture data in real time.

For analog data, which has been widely used in the past, the control of copyrights during processing has not been an important issue because the quality of the analog data deteriorates each time the data is stored, copied, edited, or transferred, the editing of a copyright produced due to the above operation has not been a large problem. However, the quality of digital data does not deteriorate when the data is repeatedly stored, copied, edited, or transferred. Therefore, the management and control of copyrights during processing of digital data is an important issue.

Up to now, there has been no adequate method for management and control of copyrights for digital data. It has been managed and controlled merely by copyright law or by contracts. In copyright law, only compensation for digital sound or picture recording devices has been prescribed.

It is possible not only to refer to the content of a database, but also to effectively utilize the data obtained from the database by storing, copying, or editing the data, and also transferring the edited data to the database with the edited data registered as new data. Further, it is possible to transfer edited data to other persons via a communication link or by a proper recording medium.

In a conventional database system, only character data is handled. However, in multimedia systems, sound data and picture data originally generated as analog data, are digitized and used as part of the database in addition to the other data in the database such as character data.

Under such circumstances, it is an important question to determine how to handle copyrights of the data in the database. However, there are no means in the prior art for copyright management and control of such actions as copying, editing, transferring, etc. of data.

The inventors of the present invention proposed a system for copyright management, wherein a permit key is obtained from a key control center via a public telephone line in Japanese Patent Laid-Open No. 46419/1994 and Japanese Patent Laid-Open No. 141004/1994. Japanese Patent Laid-Open No. 132916/1994 to the same inventors also discusses an apparatus for copyright management and control.

The database copyright management system of the prior applications use one or any combination of the copyright control program, the copyright information, and the copyright control message in addition to a permit key corresponding to a request.

The copyright control message is displayed on a screen and advises or warns the user if the data is utilized in a manner inconsistent with the user's request permission. The copyright control program watches and controls data use so that the data is not utilized beyond the conditions of the user's request or permission.

The copyright control program, the copyright information and the copyright control message are supplied together with a permit key in some cases, but they may be supplied with data in other cases. It is also possible to supply a part of them together with the permit key, and to supply the other part with the data.

For the data, the permit key, the copyright control message, the copyright information, or the copyright control program, there are the following three cases: they are transmitted in encrypted form and decrypted upon use; they are transmitted in encrypted form and decrypted only when they are displayed; or they not encrypted at all.

SUMMARY OF THE INVENTION

The present invention provides a data copyright management system comprising a database for storing original data, a key control center for managing a crypt key, a copyright management center for managing a data copyright. A communication network is provided to connect the database, the key control center, and the copyright management center, wherein data from the database is encrypted and the user decrypts the data with a crypt key obtained from the key control center or the copyright management center.

For supplying data to a user, there are the following two methods: a one-way communication of encrypted data to the user such as by broadcasting; and a two-way communication of encrypted data to the user in accordance with the user's request.

Different schemes are available for a cryptographic system: a secret-key cryptosystem, a public-key cryptosystem, or a system combining a secret-key and a public-key. A cryptographic system further uses a copyright control program for managing data copyrights.

When a user stores, copies, or transmits data, the data is encrypted by a crypt key, which is obtained from the key control center or from the copyright management center, or generated by the copyright control program.

The present invention can be applied to copyright control not only a single data value but also a plurality of data values from a single database or a plurality of data values supplied from a plurality of databases. Further, an apparatus is also proposed for performing data copyright management.

DETAILED DESCRIPTION OF THE INVENTION

The present invention is a database copyright management system described with respect to multimedia applications. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

The cryptography system, in general, includes a secret-key cryptosystem and a public-key cryptosystem. The secret-key cryptosystem is a cryptosystem in which the same crypt key is used for encryption and decryption. Although this cryptosystem requires relatively shorter time for encryption or decryption, once the secret-key is known, the cryption can be cryptanalyzed.

The public-key cryptosystem is a cryptosystem which provides two keys: a key for encryption open to the public as a public-key and a key for decryption not open to the public. The key for encryption is referred to as a public key and the key for decryption is referred to as a private key. A party transferring information encrypts the information with a public-key of a receiving party and the receiving party decrypts the information with a private-key. While this cryptosystem requires relatively longer time for encryption or decryption, the private-key is hard to find and it is very difficult to cryptanalyze the cryption.

In the cryptography, the encryption of a plaintext M with a crypt key K to obtain a cryptogram C is expressed as $C = E(K, M)$ and the decryption of the cryptogram C with the cryptographic key K to obtain the plaintext M is expressed as $M = D(K, C)$.

The cryptosystem used for the present invention uses a secret-key cryptosystem in which the same secret-key Ks is used for encryption and decryption, and a public-key cryptosystem in which a public-key Kb is used for encryption of a plaintext and a private-key Kv is used for decryption of a cryptogram.

In Japanese Patent Application No. 64889/1994, the present inventors proposed a copyright management method for primary utilization of digital data such as display (including sound) or storage of the digital data in a database system including real-time transmission of a digital picture as well as secondary utilization of the digital data such as copying, editing, or transferring of the digital data.

The present invention applies the data copyright management method proposed in the Japanese Patent Application No. 64889/1994 to provide a data copyright management system.

Embodiment 1

Figure 1:
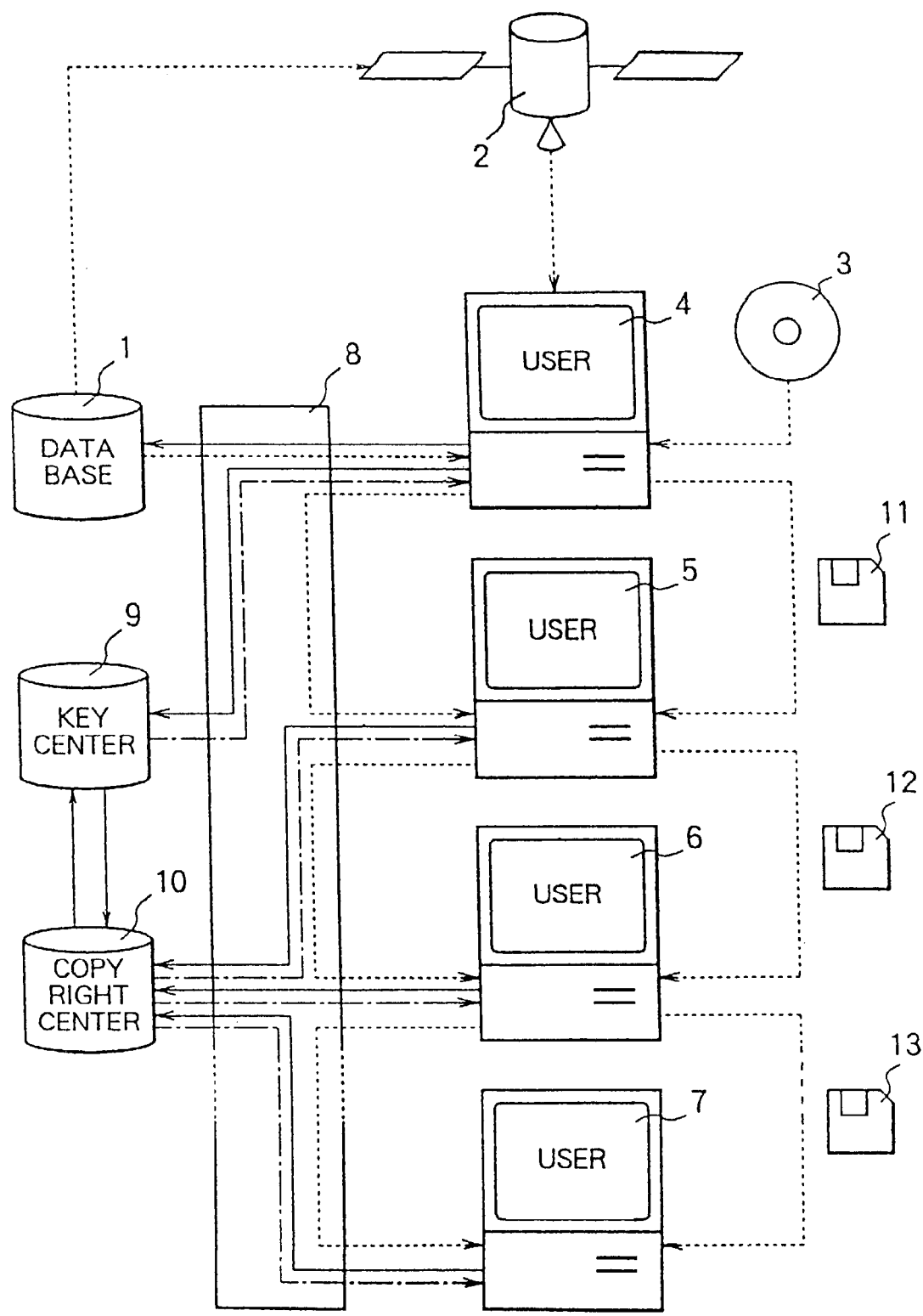
FIG. 1 illustrates a data copyright management system for embodiments 1, 2, and 3 of the present invention.

FIG. 1 shows the first embodiment of the data copyright management system of the present invention. The first embodiment uses the secret-key system as a cryptosystem.

The embodiment of FIG. 1 comprises database 1 in which text data, binary data serving as a computer graphic display or a computer program, digital audio data, and digital picture data are stored in encrypted form, space satellite 2 such as a communications satellite or a broadcasting satellite, data recorder 3 such as a CD-ROM or a flexible disk, communication network 8 such as a public telephone line offered by a communication enterprise or a CATV (cable TV) line offered by a cable television enterprise, primary user terminal 4, key control center 9 for managing a secret-key, and copyright management center 10 for managing data copyrights.

Reference numerals 5, 6, and 7 represent a secondary user terminal, a tertiary user terminal, and n-order user terminal respectively, and 11, 12, and 13 represent a secondary disk, tertiary disk, and n-order disk serving as a recording medium such as a flexible disk or CD-ROM respectively. The symbol "n" represents an optional integer. When "n" is larger than 4, a corresponding user terminal and a corresponding disk are arranged between tertiary user terminal 6 and the n-order user terminal 7 and between the tertiary disk 12 and the n-order disk 13 respectively.

In the above arrangement, database 1, key control center 9, copyright management center 10, primary user terminal 4, secondary user terminal 5, tertiary user terminal 6, and n-order user terminal 7 are connected to communication network 8.

In FIG. 1, the broken line indicates encrypted data flow, the solid line indicates requests from each user terminal, and the one-dot chain line indicates authorization information corresponding to a utilization request and a secret-key are transferred.

When the user is entered in the system, a database utilization software is given to the user. The database utilization software includes not only normal communication software such as a data communication protocol but also a program for running a copyright control program.

Original data M0 such as text data, binary data as a computer graphic display or computer program, digital audio data, or digital picture data stored in database 1 or data recording medium 3 is one-way supplied to primary user terminal 4 via the satellite 2 or recording medium 3. In this case, the data is encrypted with a first secret-key Ks1:

$Cm0ks1 = E(Ks1, M0)$.

Even if data is offered free of charge to public, it is necessary to encrypt the data in order to protect the copyright.

Japanese Patent Application No. 64889/1994 discloses that the data utilization includes not only displaying of data but also storing, editing, copying, and transferring of the data, and that a use permit key is prepared for one or several forms of use and its management is executed by the copyright control program. It is further described in the Japanese application that data is encrypted again by the copyright control program for storing, copying, editing and transferring of the data other than display and edit operations. Thus, the data is encrypted for distribution, and decrypting is performed only when for display or edit operations in a user terminal with a copyright handling capability.

This embodiment applies the method described above in the prior application.

A primary user who desires primary utilization of the encrypted data Cm0ks1 makes a request by sending the original data name or the original data number to key management center 9 via communication network 8 from primary user terminal 4. In this case, the primary user must present information Iu1 for primary user to key management center 9.

Key management center 9 receiving the primary utilization request from primary user terminal 4 transfers the first secret-key Ks1 for decrypting the encrypted original data Cm0ks1 obtained from database 1 by the primary user and the second secret-key Ks2 for re-encrypting the decrypted original data M0 or edited data M1 from the original data, together with a copyright control program P via communication network 8 to primary user terminal 4.

In primary user terminal 4 receiving the first secret-key Ks1 as a decryption key and the second secret-key Ks2 as an encryption/decryption key, the encrypted original data Cm0ks1 is decrypted by using the copyright control program P and the first secret-key Ks1 to use the decrypted original data M0 directly or data M1 as edited.

M0=D(Ks1, Cm0ks1)

When the data M, which can be the original data M0 or edited data M1, is stored in a memory or a built-in hard disk drive of primary user terminal 4, only the primary user can use the data. However, when the data M is copied to external recording medium 11 such as a flexible disk or transmitted to secondary user terminal 5 via communication network 8, a copyright problem due to secondary utilization might occur.

When the original data M0 obtained by a primary user is directly copied and supplied to a secondary user, the copyright of the primary user is not affected on the data M0 because the original data M0 is not modified at all. However, when the primary user produces new data M1 by editing the obtained data or by using other methods such as combining with other data, the copyright of the primary user, i.e., secondary exploitation right for secondary utilization of original data, is affected on the data M1.

Similarly, when a secondary user produces new data M2 by editing the original data M0 or edited data M1 obtained from the primary user by methods such as combining with other data, the copyright of the secondary user; i.e., secondary exploitation right on the secondary user is also effected.

In this embodiment, in order to protect the copyrights, the data M is encrypted by the second secret-key Ks2 using the copyright control program P when the data M is stored, copied, or transferred. Thereafter, in primary user terminal 4, the data M is decrypted and encrypted by the second secret-key Ks2:

Cmks2=E(Ks2, M)
M=D(Ks2, Cmks2).

It is also possible to limit the number of repeated operations by the copyright control program.

When the data M is copied to external recording medium 11 or transmitted via communication network 8, the first secret-key Ks1 and the second secret-key Ks2 in primary user terminal 4 are disused by the copyright control program P. Therefore, in order to reuse the data M, the primary user needs to request for utilization of the data M to key control center 9 to reobtain the second secret-key Ks2.

If the user receives the regrant of the second secret-key Ks2, that represents secondary utilization of data in which the data M has been copied to external recording medium 11 or transmitted to secondary user terminal 5 via communication network 8. Therefore, the fact is registered in copyright management center 10 from key control center 9 and subsequent secondary utilization comes possible.

The data M is moved from primary user terminal 4 to secondary user terminal 5 by external recording medium 11 or communication network 8. When the data M is copied to external recording medium 11 or transmitted via communication network 8, it is encrypted by the second secret-key Ks2.

When the data M is copied to external recording medium 11 and transmitted via communication network 8, the first secret-key Ks1 and the second secret-key Ks2 in primary user terminal 4 are disused. In this case, uncrypted primary user information Iu1 is added to the encrypted data Cmks2 stored in primary user terminal 4 and when the encrypted data Cmks2 is transmitted to a secondary user, the primary user information Iu1 is also transferred.

A secondary user who desires secondary utilization of the encrypted data Cmks2 copied or transmitted from a primary user must present original data name or data number to copyright management center 10 via communication network 8 by secondary user terminal 5 and also present the secondary user information Iu2 to request secondary utilization of the data Cmks2 to the center 10. In this case, the secondary user further presents the uncrypted primary user information Iu1 added to the encrypted data Cmks2 in order to clarify the relationship with the primary user.

Copyright management center 10 confirms that the primary user has received a regrant of the second secret-key Ks2 for secondary utilization of the data, in accordance with the presented primary user information Iu1. Copyright management center 10, then, transfers the second secret-key Ks2 serving as a decryption key and the third secret-key Ks3 serving as an encryption/decryption key to secondary user terminal 5 via communication network 8.

In secondary user terminal 5 receiving the second secret-key Ks2 and the third secret-key Ks3, the encrypted data Cmks2 is decrypted using the second secret-key Ks2 by the copyright control program P M=D(Ks2, Cmks2)

and is secondarily utilized for display or edit operations.

In this embodiment, key control center 9 processes a primary utilization requests and copyright management center 10 processes a secondary utilization requests. While the data M supplied to a primary user is encrypted by the first secret-key Ks1, the data M supplied to a secondary user is encrypted by the second secret-key Ks2. Further, the first secret-key Ks1 and the second secret-key Ks2 are transferred to the primary user as crypt keys from key control center 9.

Therefore, if the secondary user, instead of the primary user, falsely makes a request for primary utilization to key control center 9, the first secret-key Ks1 for decryption and the second secret-key Ks2 for encryption/decryption are transferred to the secondary user. However, the secondary user cannot decrypt the encrypted data Cmks2 by using the first secret-key Ks1 transferred as a decryption key.

Therefore, it is impossible to falsely request for data utilization and as a result, not only the original copyright of data but also the copyright of the primary user on the data are protected.

When storing, copying, or transferring of the data M other than displaying and displaying for editing is performed in secondary user terminal 5, the data M is encrypted using the third secret-key Ks3 by the copyright control program P and thereafter, the data is decrypted and encrypted by the third secret-key Ks3:

Cmks3=E(Ks3, M)

M=D(Ks3, Cmks3).

Further, it is free in principle that a secondary user displays and edits data to obtain the edited data M2. In this case, it is possible to limit the repetitions of the operation by the copyright control program P.

When the data M is copied to external recording medium 12 or transmitted via communication network 8, the second secret-key Ks2 and the third secret-key Ks3 in secondary user terminal 5 are disused by the copyright control program P. Therefore, in order to reuse the data M, the secondary user makes a request for the utilization of the data to copyright management center 10 to reobtain the third secret-key Ks3.

The fact that the secondary user receives a regrant of the third secret-key Ks3 represents secondary utilization of data in which the data M has been copied to external recording medium 12 or transmitted to tertiary user terminal 6 via communication network 8. Therefore, the fact is entered in copyright management center 10 and allows the secondary user for further data use.

The data M is moved from secondary user terminal 5 to tertiary user terminal 6 by external recording medium 12 or by communication network 8. When the data M is copied to external recording medium 12 or transmitted via communication network 8, it is encrypted by the third secret-key Ks3.

When the data M is copied to external recording medium 12 or transmitted to tertiary user terminal 6 via communication network 8, the second secret-key Ks2 and the third secret-key Ks3 in secondary user terminal 5 are disused. In this case, the uncrypted secondary user information Iu2 is added to the encrypted data Cmks3 stored in secondary user terminal 5, and when the encrypted data Cmks3 is transmitted to a tertiary user, the secondary user information Iu2 is also transferred.

For adding user information to data, there are the following two cases: every information is added to data whenever it is copied or transmitted; and the history updated whenever the data is copied or transmitted is stored in the copyright management center.

A tertiary user who desires tertiary utilization of the encrypted data Cmks3 copied or transmitted from the secondary user must present original data name or number to copyright management center 10 from a tertiary user terminal 6 via communication network 8 together with the tertiary user information Iu3 to request tertiary utilization of the data. In this case, the tertiary user further presents the uncrypted secondary user information Iu2 added to the encrypted data Cmks3 in order to show the relationship with the secondary user.

Copyright management center 10 confirms that the secondary user has received a regrant of the third secret-key Ks3 for tertiary utilization of the data, in accordance with the presented secondary user information Iu2. Copyright management center 10, then, transfers the third secret-key Ks3 serving as a decryption key and the fourth secret-key Ks4 serving as an encryption/decryption key to tertiary user terminal 6 via communication network 8.

In tertiary user terminal 6 receiving the third secret-key Ks3 and the fourth secret-key Ks4, the encrypted data Cmks3 is decrypted using the third secret-key Ks3 by the copyright control program P M=D(Ks3, Cmks3)

and is tertiarily utilized for operations such as display or edit.

In this embodiment, the data M supplied to a primary user is encrypted by the first secret-key Ks1 and the data M supplied to a secondary user is encrypted by the second secret-key Ks2, and the data M supplied to a tertiary user is encrypted by the third secret-key Ks3.

Therefore, if the tertiary user, instead of the primary user, falsely sends a request for primary utilization to key control center 9, the first secret-key Ks1 for decryption and the second secret-key Ks2 for encryption/decryption are transferred to the tertiary user. However, it is impossible to decrypt the encrypted data Cmks3 by the first secret-key Ks1 transferred as a decryption key. Further, if the tertiary user, instead of the secondary user, falsely sends a request for secondary utilization to key control center 9, the second secret-key Ks2 and the third secret-key Ks3 are transferred to the tertiary user as a decryption key and an encryption/decryption key respectively. However, it is impossible to decrypt the encrypted data CmKs3 by the second secret-key Ks2 transferred as a decryption key.

Therefore, it is impossible to falsely request data utilization. As a result, not only the original copyright of the data but also the copyrights of the primary and secondary users on the data are protected.

The same procedure is applied to quaternary and subsequent utilization.

In the above described embodiment, database 1, key control center 9, and copyright management center 10 are separately arranged. However, it is not always necessary to arrange them separately. It is also possible to arrange all of or two of them integrally.

Further, it is also possible to send a request for a regrant of a secondary crypt key from the primary user to copyright management center 10 instead of to key control center 9 as described in the above embodiment.

Embodiment 2

Though the structure of this embodiment is mostly the same as that of the embodiment 1, a copyright control program and, if required, first and second secret-keys are encrypted and supplied.

Also in the case of this embodiment, similarly to the case of the first embodiment, original data is encrypted and supplied in a one-way communication to a user from a single database and the user selects desired data out of the original data.

Because the system structure used for the second embodiment is the same as that of embodiment 1 shown in FIG. 1, description of the system structure is omitted.

In this embodiment, the original data M0 stored in database 1 is supplied in a one-way communication to primary user terminal 4 via the satellite 2, recording medium 3, or communication network 8. The data M0 is encrypted by the first secret-key Ks1:

Cm0ks1=E(Ks1, M0).

A primary user who desires primary utilization of the supplied encrypted data Cm0ks1 sends a request for the primary utilization of the encrypted original data Cm0ks1 to key control center 9 by using primary user terminal 4 and presenting an original data name or an original data number via communication network 8. In this case, the primary user must present the primary user information Iu1 to key control center 9.

The key management 9 receiving the request of the primary utilization of the encrypted original data Cm0ks1 generates a secret-key Ksu1 unique to the primary user using the primary user information Iu1 and transfers it to copyright management center 10.

Copyright management center 10 receives the secret-key Ksu1 and encrypts the copyright control program P by using the secret-key Ksu1 which is unique to the primary user.

Cpksu1=E(Ksu1, P)

Copyright management center 10 transfers the encrypted copyright control program Cpksu1 to key control center 9. The encrypted copyright control program Cpksu1 thus generated is unique to the primary user.

Key control center 9 transfers the first secret-key Ks1 for decryption and the second secret-key Ks2 for decryption/encryption to primary user terminal 4 via communication network 8, together with the encrypted copyright control program Cpksu1 received from copyright management center 10.

In primary user terminal 4 receiving the encrypted copyright control program Cpksu1, first secret-key Ks1, and second secret-key Ks2, database system software S previously distributed generates a primary user unique secret-key Ksu1 in accordance with the primary user information Iu1:

Ksu1=S(Iu1),

An encrypted copyright control program Cpksu1 is decrypted by the generated primary user unique secret-key Ksu1:

P=D(Ksu1, Cpksu1), the encrypted original data Cm0ks1 is decrypted by the first secret-key Ks1 using the copyright control program P:

M0=D(Ks1, Cm0ks1), and the decrypted original data M0 directly or edited data M1 is used.

When the data M such as the original data M0 or edited data M1 is stored, copied, or transferred, it is encrypted by the copyright control program P using the secret-key Ks2, and thereafter the data M is decrypted and encrypted in primary user terminal 4 by the second secret-key Ks2:

Cmks2=E(Ks2, M)

M=D(Ks2, Cmks2).

When the data M is copied to external recording medium 11 or the data is transmitted via communication network 8, the first secret-key Ks1 and the second secret-key Ks2 in primary user terminal 4 are disused by the copyright control program P. Therefore, when the primary user uses the data M again, the user sends a request for utilization of the data M to key control center 9 to reobtain the second secret-key Ks2.

The fact that the primary user receives a regrant of the second secret-key Ks2 represents secondary utilization of data in which the data M has been copied to external recording medium 11 or transmitted to secondary user terminal 5 via communication network 8. Therefore, this is entered in copyright management center 10 from key control center 9 and thereafter, secondary utilization of the data can be made.

The data M is moved from primary user terminal 4 to secondary user terminal 5 by external recording medium 11 or by communication network 8.

When the data M is copied to external recording medium 11 or transmitted via communication network 8, it is encrypted by the second secret-key Ks2.

When the data M is copied to external recording medium 11 or transmitted via communication network 8, the first secret-key Ks1 and the second secret-key Ks2 in primary user terminal 4 are disused. In this case, the uncrypted information Iu1 on a primary user is added to the encrypted data Cmks2 stored in primary user terminal 4. Therefore, when the encrypted data Cmks2 is transmitted to a secondary user, the primary user information Iu1 is also transferred to the user.

A secondary user who desires secondary utilization of the encrypted data Cmks2 copied or transmitted from the primary user must designate a data name or number added to the original data to copyright management center 10 via communication network 8 by secondary user terminal 5 and also present a secondary user information Iu2 to request for the secondary utilization of the data to the center 10. In this case, the secondary user further presents the uncrypted primary user information Iu1 added to the encrypted data Cmks2 in order to clarify the relationship with the primary user.

Copyright management center 10 confirms that the primary user has received a regrant of the secondary secret-key Ks2 for secondary-utilizing the data in accordance with the presented primary user information Iu1 and then, generates a secret-key Ksu2 unique to the secondary user in accordance with the presented secondary user information Iu2.

Copyright management center 10 encrypts the copyright control program P by the secondary user unique secret-key Ksu2

Cpksu2=E(Ksu2, P)

and transfers the encrypted copyright control program Cpksu2, second secret-key Ks2 serving as a decryption key, and third secret-key Ks3 serving as an encryption/decryption key via communication network 8 to secondary user terminal 5.

Further, the information Iu1 for a primary user may be added to the encrypted copyright control program Cpksu2.

In secondary user terminal 5 receiving the second secret-key Ks2 and the third secret-key Ks3, database utilization software generates a secondary user unique secret-key Ksu2 in accordance with the secondary user information Iu2

Ksu2=S(Iu2), and an encrypted copyright control program Cpksu2 by the generated secondary user unique secret-key Ksu2

P=D(Ksu2, Cpksu2), the encrypted original data Cmks2 is decrypted by the second secret-key Ks2 using the decrypted copyright control program P M=D(Ks2, Cmks2), and the decrypted data M directly or by editing it is used.

Thus, by generating a crypt key unique to a user in accordance with the information of the user requests for utilization, and encrypting a copyright control program by the generated user unique crypt key, the security of a data copyright management system is improved.

Further, by encrypting each secret-key to be supplied to a user, using the user unique crypt key, the security of the data copyright management system can be further improved.

Embodiment 3

As still another method for solving the copyright problem caused when the data M is copied to external recording medium 11 or transmitted via communication network 8 in the system shown in FIG. 1, it is possible to limit the primary utilization request by a user of primary user terminal 4 to only for permits of displaying, storing and editing so that other utilization such as copying and transferring cannot be authorized except by separate requests, and disuse the first secret-key Ks1 and the second secret-key Ks2 in primary user terminal 4 when the data M is copied to external recording medium 11 or transmitted to secondary user terminal 5 via communication network 8.

Thus, it is possible for copyright management center 10 to more securely control copy or transfer operations of the data M.

Embodiment 4

Figure 2:
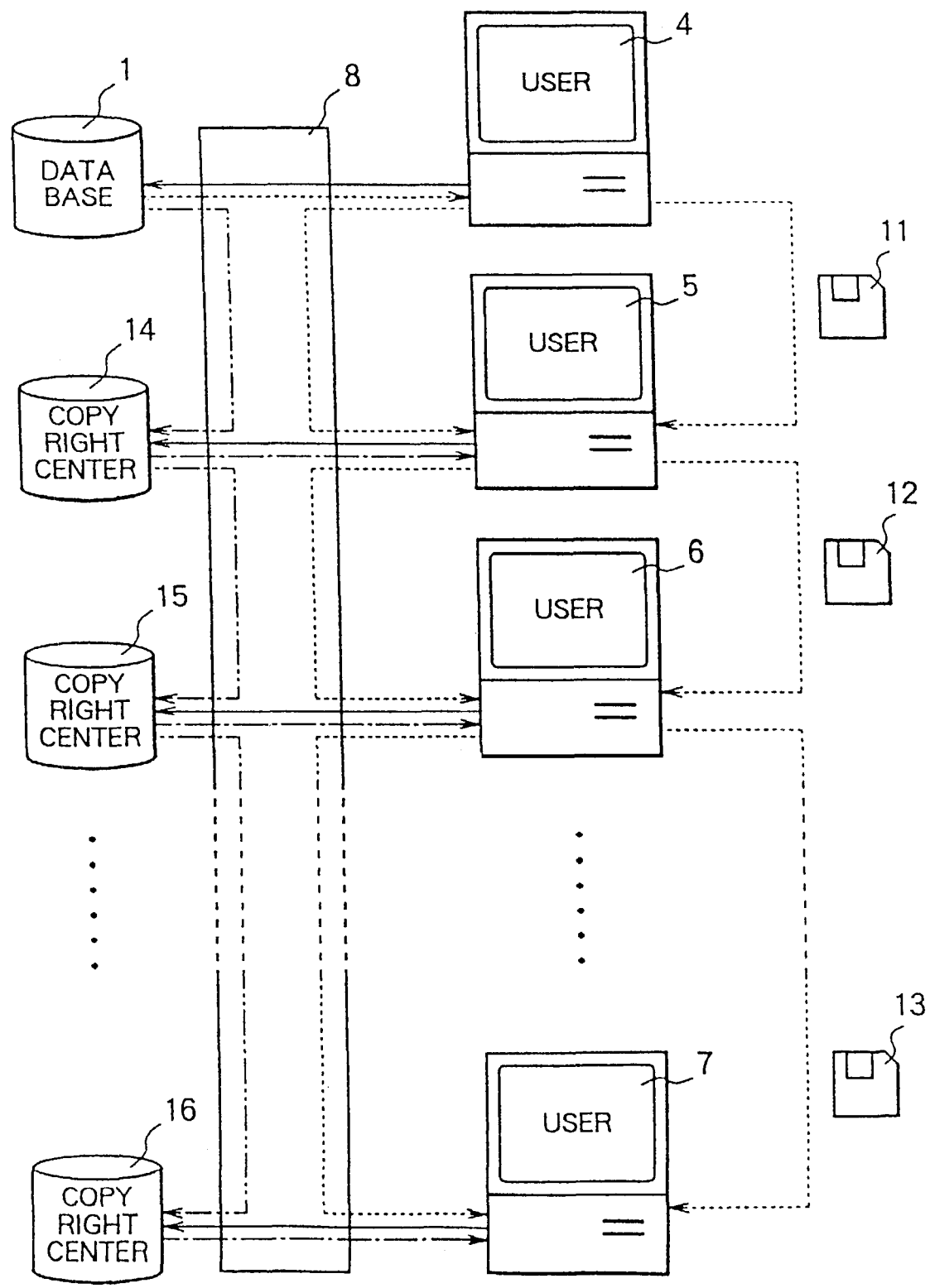
FIG. 2 illustrates a data copyright management system of embodiment 4 of the present invention.

FIG. 2 shows a structure of embodiment 4 of the data copyright management system of the present invention. In FIG. 1, encrypted data is one-way supplied via the satellite 2, recording medium 3, or communication network 8. In embodiment 2, however, encrypted data is supplied in a two-way communication in accordance with a request from the primary user 4.

This embodiment uses the public-key cryptosystem as a crypt key system. It is possible that embodiment 2 can be applied for a satellite broadcast, ground wave broadcast, CATV broadcast or a recording medium other than a database as data supply means provided with advertisement requiring no charge or encryption.

In the system shown in FIG. 2 similarly to the system shown in FIG. 1, reference numeral 1 represents a database, 4 represents a primary user terminal, 5 represents a secondary user terminal, 6 represents a tertiary user terminal, and 7 represents an n-order user terminal.

Reference numeral 14 represents a secondary copyright management center, 15 represents a tertiary copyright management center, 16 represents an n-order copyright management center, 8 represents a communication network such as a public telephone line offered by a communication enterprise or a CATV line offered by a cable television enterprise.

In the above arrangement, database 1, primary user terminal 4, secondary user terminal 5, tertiary user terminal 6, n-order user terminal 7, secondary copyright management center 14, tertiary copyright management center 15, and n-order copyright management center 16 are connected to communication network 8. They can also be connected to each other.

In FIG. 2, the broken line represents a path for encrypted data, the solid line represents a path of requests from each user terminal, the one-dot chain line represents a path through which authorization information sent from each database corresponding to a utilization request and a crypt key are transferred, and a two-dot chain line represents a path through which copyright information is transferred from the database or each copyright management center database to a next-order copyright management center database.

Each user who uses this system is previously entered in a database system and in this time, database utilization software is provided to the user. The database utilization software includes a program for decrypting an encrypted copyright control program in addition to normal communication software such as a data communication protocol.

To use database 1, a primary user must prepare primary-user authentication data Au1, a first public-key Kb1, a first private-key Kv1 corresponding to the first public-key Kb1, a second public-key Kb2, and a second private-key Kv2 corresponding to the second public-key Kb2, and accesses database 1 from primary user terminal 4 via communication network 8.

Database 1 receives the primary-user authentication data Au1, first public-key Kb1 and second public-key Kb2 from the primary user, confirms the primary-user authentication data Au1, and transfers the confirmed primary-user authentication data Au1 to the secondary copyright management center 14 as the primary user information Iu1.

Database 1 prepares two secret-keys, i.e., the first secret-key Ks1 and the second secret-key Ks2. The two secret-keys may be prepared by using key control center 9 of embodiment 1 shown in FIG. 1.

In the prepared first secret-key Ks1 and second secret-key Ks2, the second secret-key Ks2 is also previously transferred to the copyright management center 14.

As the result of the transfers, the primary user information Iu1 corresponding to primary utilization, original copyright information Ic and the second secret-key Ks2 are stored in the copyright management center 14. In this case, the original copyright information Ic is used for copyright royalties distribution.

When a primary user who desires data utilization accesses database 1 from primary user terminal 4, a data menu is transferred to him. In this case, information for charges may be displayed together with the data menu.

When the data menu is transferred, the primary user retrieves in the data menu to select the data M. In this case, the original copyright information Ic of the selected data M is transmitted to the copyright management center 14.

The original data M0 is read out of database 1 in accordance with a request of a primary user. The original data M0 is then encrypted by the first secret-key Ks1:

Cm0ks1=E(Ks1, M0).

The encrypted data Cm0ks1 is provided with the uncrypted original copyright information Ic.

The first secret-key Ks1 is encrypted by the first public-key Kb1 and the second secret-key Ks2 is encrypted by the second public-key kb2:

Cks1kb1=E(Kb1, Ks1)
Cks2kb2=E(Kb2, Ks2).

While the copyright control program P is also encrypted by the second public-key Ks2

CpKs2=E(Ks2, P), the copyright control program P may not be encrypted by the second secret-key Ks2, but it may be encrypted by any other proper crypt key.

The encrypted original data Cm0ks1, encrypted copyright control program Cpks2, and two encrypted secret-keys Cks1kb1 and Cks2kb2 are transferred to primary user terminal 4 via communication network 8, and the user is charged for the service, if necessary.

It is possible to store the encrypted copyright control program Cpks2 in a storage device such as ROM in the user terminal 4 instead of being supplied from database 1.

The primary user receiving the encrypted original data Cm0ks1, two encrypted secret-keys Cks1kb1 and Cks2kb2, and encrypted copyright control program Cpks2 from database 1 decrypts the encrypted first secret-key Cks1kb1 by the database utilization software using the first private-key Kv1 corresponding to the first public-key Kb1:

Ks1=D(Kv1, Cks1kb1), and decrypts the encrypted second secret-key Cks2kb2 using the second private-key Kv2 corresponding to the second public-key Kb2:

Ks2=D(Kv2, Cks2kb2).

The primary user decrypts the encrypted copyright control program Cpks2 using the decrypted second secret-key Ks2:

P=D(Ks2, Cpks2).

Finally, the primary user decrypts the encrypted data Cm0ks1 by the decrypted copyright control program P using the decrypted first secret-key Ks1:

M0=D(Ks1, Cm0ks1)

and uses the decrypted original data M0 or data M1 as edited.

As described above, the first private-key Kv1 and second private-key Kv2 are crypt keys prepared by the primary user, but the keys are not known to others. Therefore, even if a third party obtains the data M, it is impossible to use the encrypted data M by decrypting it.

Thereafter, the data M such as the original data M0 or the edited data M1 is encrypted and decrypted by the second secret-key Ks2 for operations such as store, copy, or transmit:

Cmks2=E(Ks2, M)
M=D(Ks2, Cmks2).

The decrypted second secret-key Ks2 is thereafter used as a crypt key for encrypting/decrypting data for storing, copying, or transferring the data.

The first private-key Kv1 and second private-key Kv2, the first secret-key Ks1 and second secret-key Ks2, the data M, the copyright control program P, the original copyright information Ic, and also the original copyright information Ic and secondary copyright information Ic1 for information of the primary user and the date and time of edit operations by the primary user are stored in primary user terminal 4.

It is further protected by attaching the copyright information Ic1 to the data as copyright information label, and adding the digital signature.

The encrypted data Cmks2 is encrypted before distribution. Since the copyright information label provides a due to obtain the second secret-key Ks2 which is the key for decryption, the second secret key Ks2 cannot be obtained when the copyright information label is removed from the encrypted data Cmks2.

When the encrypted data Cmks2 is stored in primary user terminal 4, the second secret-key Ks2 is stored in the terminal 4. However, when the encrypted data Cmks2 is not stored in primary user terminal 4 but is copied to the recording medium 11 or transmitted to secondary user terminal 5 via communication network 8, the second secret-key Ks2 is disused in order to prevent subsequent utilization of the data in primary user terminal 4.

In this case, it is possible to set a limit on the number of repeated operations such as copy or transfer of the data so that the second secret-key. Ks2 is not disused within limited repetitions of copying and transferring of the data.

A primary user who is going to copy the data M to external recording medium 11 or transmit the data M via communication network 8 must prepare the second secret-key Ks2 to encrypt the data M by this second secret-key Ks2 before copying or transferring the data:

Cmks2=E(Ks2, M).

The uncrypted original copyright information Ic and primary-user copyright information Ic1 are added to the encrypted data Cmks2.

Before using a database, a secondary user, similar to the primary user, prepares authentication data Au2 to authenticate the secondary user, a third public-key Kb3 and a third private-key Kv3 corresponding to the third public-key Kb3, a fourth public-key Kb4, and a fourth private-key Kv4 corresponding to the fourth public-key Kb4.

A secondary user who desires secondary utilization of the copied or transmitted encrypted data Cmks2 must designate original data name or number to the secondary copyright management center 14 to request secondary utilization to the center 14 from secondary user terminal 5 via communication network 8. In this case, the secondary user also transfers the third public-key Kb3 and the fourth public-key Kb4 as well as the secondary user authentication data Au2, original copyright information Ic and primary user copyright information Ic1.

The secondary copyright management center 14 receives the secondary utilization request from the secondary user, confirms the secondary-user authentication data Au2, and transfers confirmed secondary-user authentication data Au2 to the tertiary copyright management center 15 as secondary user information.

When the secondary copyright information Ic1 of the primary user is transferred, the secondary copyright information Ic1 is confirmed by the secondary copyright center 14. The secondary copyright information Ic1 is then transferred to the tertiary copyright management center 15.

The secondary copyright management center 14 prepares a third secret-key Ks3. The third secret-key Ks3 can also be prepared by key control center 9 shown in embodiment 1.

The prepared third secret-key Ks3 is transferred to and stored in the tertiary copyright management center 15.

As the result of the transfers, primary user copyright information Ic1, primary user information Iu1, original copyright information Ic, secondary user information Iu2, and third secret-key Ks3 are stored in the tertiary copyright management center 15. The primary user copyright information Ic1, and primary user information Iu1 are used for copyright royalties distribution.

Similarly, copyright information for secondary exploitation right Ic1 of (n−1) order user, primary user information Iu1, original copyright information Ic, n-order user information Iun, and n-th secret-key Ksn are stored in n-order copyright management center 16.

The primary user information Iu1, original copyright information Ic and second secret-key Ks2 are read out of the secondary copyright management center 14. The original copyright information Ic is used for copyright royalties distribution.

The second secret-key Ks2 and third secret-key Ks3 are then encrypted by the third public-key Kb3 and fourth public-key Kb4 of the secondary user respectively:

Cks2kb3=E(Kb3, Ks2)
Cks3kb4=E(Kb4, Ks3).

The copyright control program P is encrypted by the third secret-key Ks3 and the third secret-key Ks3 is encrypted by the fourth public-key Kb4:

Cpks3=E(Ks3, P)
Cks3kb4=E(Kb4, Ks3).

The encrypted copyright control program Cpks3, encrypted second secret-key Cks2kb3, and encrypted third secret-key Cks3kb4 are transferred to secondary user terminal 5 via communication network 8. In this case, charging is performed, if necessary.

The secondary user receives two encrypted secret-keys Cks2kb3 and Cks3kb4 and the encrypted copyright control program Cpks3 from the secondary copyright management center 14, decrypts the encrypted second secret-key Cks2kb3 by the third private-key Kv3, and decrypts the encrypted third secret-key Cks3kb4 by the fourth private-key Kv4 corresponding to the fourth public-key Kb4, using the database utilization software:

Ks2=D(Kv3, Cks2kb3)
Ks3=D(Kv4, Cks3kb4).

The encrypted copyright control program Cpks3 is decrypted by the decrypted third secret-key Ks3:

P=D(Ks3, Cpks3).

Then, the encrypted data Cmks2 is decrypted for the decrypted copyright control program P and the decrypted second secret-key Ks2:

M=D(Ks2, Cmks2).

As described above, the third private-key Kv3 and the fourth private-key Kv4 are prepared by a secondary user, but they are not known to others. Therefore, even if a third party obtains the encrypted data Cmks2, it is impossible to use the data by decrypting it.

In the above described embodiment, database 1, secondary copyright management center 14, tertiary copyright management center 15, and n-order copyright management center 16 are separately arranged in order to avoid the congestion of utilization requests. However, if the congestion of utilization requests is not a critical issue, it is possible to combine all or some of these functions into one.

Embodiment 5

Figure 3:
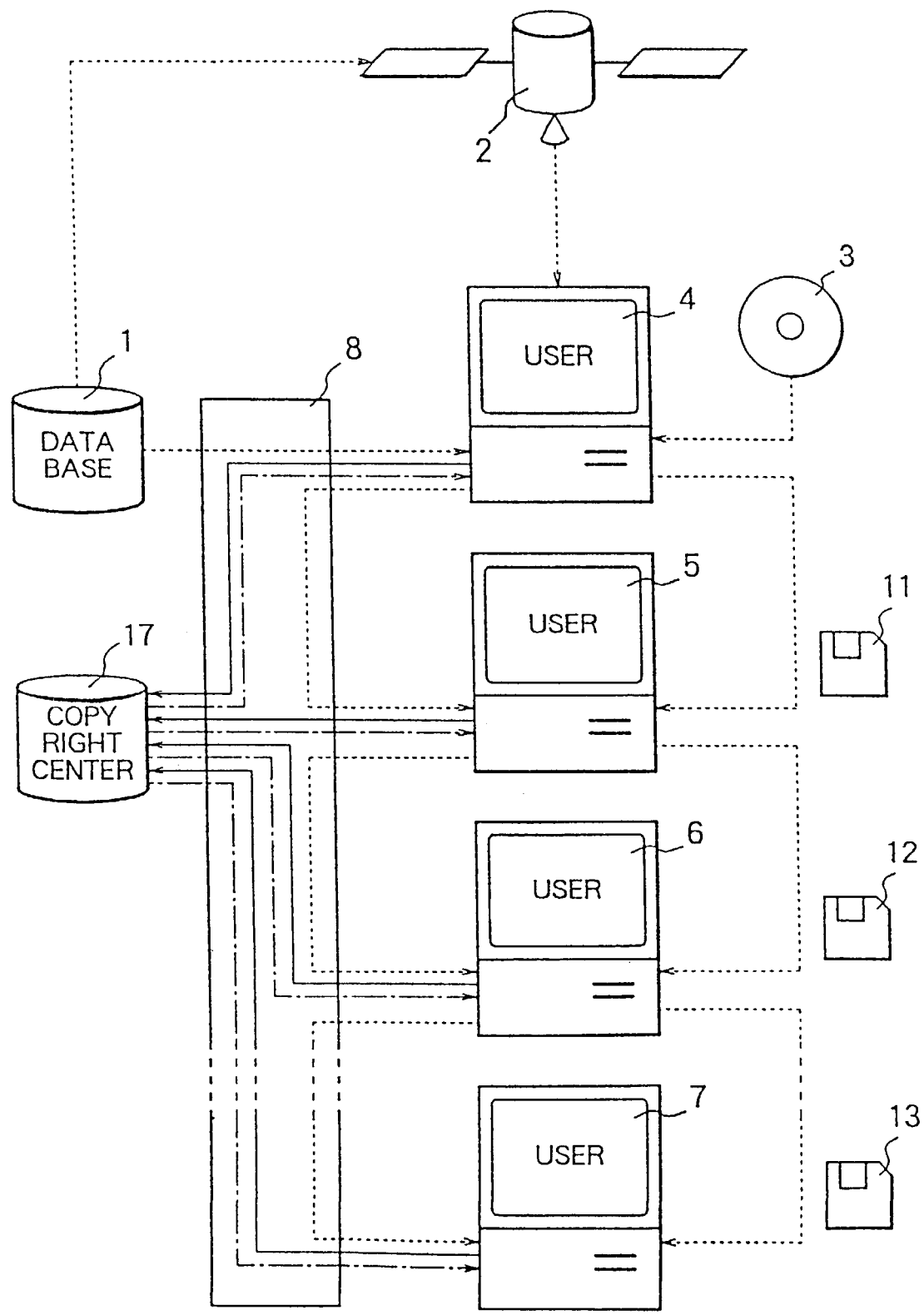
FIG. 3 illustrates a data copyright management system for embodiments 5, 6, and 7 of the present invention.

FIG. 3 shows the system structure of embodiment 5. In embodiment 5, original data is encrypted and supplied in a one-way communication from a single database and a user selects necessary data out of the supplied original data to use it. This embodiment uses a secret-key cryptosystem as its crypt key system.

In FIG. 3, reference numeral 1 represents a database in which text data, binary data serving as computer graphics display or computer program, digital audio data, and digital picture data are stored by being encrypted, 2 represents a space satellite such as a communication satellite or a broadcasting satellite, 3 represents a data recording medium such as a CD-ROM or a flexible disk, 8 represents a communication network such as a public telephone line offered y a communication enterprise or a CATV line offered by a cable television enterprise, and 4 represents a primary user terminal. Reference numeral 17 represents a copyright management center for managing the copyright on data, and 5, 6, and 7 represent a secondary user terminal, tertiary user terminal, and n-order user terminal, respectively.

In the above arrangement, database 1, copyright management center 17, primary user terminal 4, secondary user terminal 5, tertiary user terminal 6 and n-order user terminal 7 can be connected with each other by communication network 8.

Each user who uses this system is previously entered in the database system, and when entered in the system, database utilization software is given to the user. This software includes a normal communication software program such as a data communication protocol.

Though the software for using the database system can be stored in a hard disk in a user terminal, it may be stored in a mask ROM, EPROM, or EEPROM in the user terminal.

In this system, a secret-key generation algorithm is stored in a user terminal in order to generate a secret-key from the user side. However, because the secret-key generation algorithm is not always secret, it is also possible to store the algorithm in the database utilization software supplied to a user when the user is entered for database utilization in the database system.

When original data is supplied free of charge because it is provided with advertisement, it may not be necessary to be encrypted. Even in this case, however, a procedure for using a copyright is necessary because the data is provided with a copyright.

In FIG. 3, the broken line represents a path of encrypted data, the solid line represents a path requested from each user terminal, and the one-dot chain line represents a path through which a crypt key corresponding to a utilization request is transferred.

The original data M0 stored in database 1 or the data recording medium 3 is supplied to primary user terminal 4 through a cable transmission via communication network 8, by broadcast waves via the satellite 2 or the like, or by recording medium 3. The data M0 is encrypted by the first secret-key Ks1:

Cm0ks1=E(Ks1, M0).

Similar to embodiments 1 to 4, in order to protect the copyright of the original data Cm0ks1, which is encrypted to be supplied, when store, copy, or transfer operations, which is utilization other than display or display for editing, are applied to the original data M0 in primary user terminal 4, the second secret-key Ks2 is used to encrypt the data:

Cm0ks2=E(Ks2,M0)

as disclosed in Japanese Patent Application No. 64889/1994 which is the prior application by the inventors of the present invention. In the subsequent utilization, the original data is encrypted/decrypted by the second secret-key Ks2.

A primary user obtaining the encrypted original data Cm0ks1 designates an original data name or original data number from primary user terminal 4 to request the primary utilization of the encrypted original data Cm0ks1 of the copyright management center 17.

The copyright management center 17 receives the primary utilization request of the encrypted original data Cm0ks1 from primary user terminal 4 and transfers the copyright control program P to primary user terminal 4 together with the first secret-key Ks1.

The copyright control program P includes a crypt program having a cryptographic algorithm, which generates a secret-key and decrypts or encrypts data.

Primary user terminal 4 receives the first secret-key Ks1 and the copyright control program P, decrypts the encrypted original data Cm0ks1 by the first secret-key Ks1 using the crypt program M0=D(Ks1, Cm0ks1)

and uses the decrypted original data M0 directly or data M1 as edited.

The copyright control program P generates a second secret-key Ks2 in accordance with the first secret-key Ks1:

Ks2=P(Ks1).

When the data M as the original data M0 or the edited data M1 is stored in primary user terminal 4, copied to the recording medium 11, or transmitted to secondary user terminal 5, the data is encrypted by the second secret-key Ks2 using the copyright control program P:

Cmks2=E(Ks2, M).

The data Cmks2 encrypted by the second secret-key Ks2 is copied to the recording medium 11 or transmitted to secondary user terminal 5 via communication network 8 together with the original data name or original data number.

The secondary user obtaining the encrypted data Cmks2 makes a request for the secondary utilization of the encrypted data Cmks2 to the copyright management center 17 from the secondary terminal 5 by designating the original data name or original data number.

The copyright management center 17 receives the secondary utilization request of the encrypted data Cmks2, finds out the first secret-key Ks1 in accordance with the original data name or original data number, generates the second secret-key Ks2 by the first secret-key Ks1 using the copyright control program P Ks2=P(Ks1), and supplies the generated second secret-key Ks2 to the secondary user terminal 15 together with the copyright control program P.

Secondary user terminal 5 receives the second secret-key Ks2 and the copyright control program P, decrypts the data Cmks2 encrypted by the second secret-key Ks2 using the second secret-key Ks2

$$M = D(Ks2, Cmks2)$$

and uses the data by displaying or editing it.

When the decrypted data M is stored in secondary user terminal 5, stored in the recording medium 12, or transmitted to tertiary user terminal 6 via communication network 8, the data M is encrypted by the second secret-key.

Further, it is possible to make the copyright control program P generate the third secret-key Ks3 in accordance with the second secret-key Ks2:

$$Ks3 = P(Ks2),$$

so that the data M is encrypted by the third secret-key Ks3 using the copyright control program P when the data M is stored in secondary user terminal 5, copied to the recording medium 12, or transmitted to tertiary user terminal 6 via communication network 8:

$$Cmks3 = E(Ks3, M).$$

Embodiment 6

In embodiment 6, original data is encrypted and supplied in a one-way communication from a single database to a user and the user selects necessary data out of the original data to use it, similar to embodiment 5.

This embodiment uses a secret-key cryptosystem as its crypt key system and a second secret-key is generated in accordance with primary user information and a first secret-key.

Because the system structure of embodiment 6 is the same as that of embodiment 5 shown in FIG. 3, its description is omitted.

In the embodiment 6, the original data M0 stored in database 1 is encrypted via communication network 8, by broadcast waves via the satellite 2, or by the recording medium 3 using the first secret-key Ks1:

$$Cm0ks1 = E(Ks1, M0)$$

and supplied to primary user terminal 4.

A primary user obtaining the encrypted original data Cm0ks1 makes a request for primary utilization of the encrypted original data Cm0ks1 from primary user terminal 4. The primary user must designate an original data name or original data number and present the primary user information Iu1.

The copyright management center 17 receives the primary utilization request of the encrypted original data Cm0ks1 from the primary user and supplies the first secret-key Ks1 and the copyright control program P to primary user terminal 4.

The copyright control program P includes a crypt program having a cryptographic algorithm, which generates a secret-key and thus performs decryption and encryption.

Primary user terminal 4 receives the first secret-key Ks1 and the copyright control program P, decrypts the encrypted original data Cm0ks1 by the first secret-key Ks1 using the crypt program P $$M0 = D(Ks1, Cm0ks1)$$

and uses the decrypted original data M0 or data M1 as edited.

The supplied copyright control program P generates the second secret-key Ks2 in accordance with the primary user information Iu1 or the primary user information Iu1 and the first secret-key Ks1:

$$Ks2 = P(Iu1) \text{ or}$$
$$Ks2\ P(Iu1 + Ks1).$$

Because the generated second secret-key Ks2 is based on the primary user information Iu1, it is impossible to generate the second secret-key Ks2 without the correct primary user information Iu1.

Further, it is possible to use primary user data generated in accordance with the primary user information Iu1 or the terminal number of primary user terminal 4 instead of the primary user information Iu1.

When the data M serving as the original data M0 or edited data M1 is stored in primary user terminal 4, copied to the recording medium 11, or supplied to secondary user terminal 5 via communication network 8, the data M is encrypted by the second secret-key Ks2 using the copyright control program P:

$$Cmks2 = E(Ks2, M).$$

The data Cmks2 encrypted by the second secret-key Ks2 is copied to the recording medium 11 or supplied to secondary user terminal 5 via communication network 8 together with its original data name or original data number and the primary user information Iu1.

A secondary user obtaining the encrypted data Cmks2 makes a request for secondary utilization of the data M to the copyright management center 17 from secondary user terminal 5. The user must designate the original data name or original data number and present the primary user information Iu1.

The copyright management center 17 receives the secondary utilization request of the data M, finds out the first secret-key Ks1 in accordance with the original data name or original data number, generates the second secret-key Ks2 in accordance with either of the primary user information Iu1 and first secret-key Ks1, or both, and supplies the generated second secret-key Ks2 to secondary user terminal 5 together with the copyright control program P.

The secondary user receives the second secret-key Ks2 and the copyright control program P and decrypts the encrypted data Cmks2 by the second secret-key Ks2 using the copyright control program P and in secondary user terminal 5 to use it:

$$M = D(Ks2, Cmks2).$$

When the data M is stored in secondary user terminal 5, copied to the recording medium 12, or supplied to tertiary user terminal 6 via communication network 8, the data is encrypted by the second secret-key Ks2.

Further, it is possible to make the copyright control program P generate the third secret-key Ks3 in accordance with the second secret-key Ks2 using the copyright management program P:

$$Ks3 = P(Ks2)$$

so that the data M is encrypted by the third secret-key Ks3 when the data is stored in secondary user terminal 5, copied to the recording medium 12, or supplied to tertiary user terminal 6 via communication network 8.

It is further possible to make the secondary user present the secondary information Iu2 when requesting secondary utilization to the copyright management center 17 so that the third secret-key Ks3 is generated in accordance with the presented secondary user information Iu2.

In this embodiment 6, if the copyright control program P for generating the second secret-key Ks2 can be used in entire database system in common, the same second secret-key Ks2 is generated for the same original data in any database system as long as the primary user information Iu1 or the first secret-key Ks1 is not changed.

Embodiment 7

In embodiment 7, original data is encrypted and supplied in a one-way communication to a user from a single database and the user selects necessary data out of the original data to use it, similar to the embodiments 5 and 6. This embodiment uses a secret-key cryptosystem.

In this embodiment, a second secret-key is generated in accordance with the use frequency of a copyright control program and with a first secret-key.

Because the system structure of embodiment 7 is the same as that of embodiments 5 and 6 shown in FIG. 3, its description is omitted.

The original data M0 stored in database 1 is encrypted by the first secret-key Ks1 via communication network 8, by broadcast waves via the satellite 2, or by the recording medium 3:

$Cm0ks1=E(Ks1,M0)$, and supplied to primary user terminal 4.

A primary user obtaining the encrypted original data Cm0ks1 makes a request for primary utilization of the original data M0 to the copyright management center 17 from primary user terminal 4 by designating an original data name or original data number.

The copyright management center 17 receives the primary utilization request of the original data M0 and transfers the first secret-key Ks1 and the copyright control program P to primary user terminal 4.

The copyright control program P includes a crypt program having a cryptographic algorithm, in which a crypt key is generated and data is decrypted or encrypted. Further, a counter is attached to the copyright control program P to count the use frequency of the program P.

The primary user receives the first secret-key Ks1 and the copyright control program P and decrypts the encrypted original data Cm0ks1 by the first secret-key Ks1 using the copyright control program P:

$M0=D(Ks1,Cm0ks1)$ to use the decrypted original data M0 or data M1 as edited.

When the data M serving as the original data M0 or edited data M1 is stored in primary user terminal 4, copied to the recording medium 11, or transmitted to secondary user terminal 5 via communication network 8 in order to manage the copyright of data, the data is encrypted by the second secret-key Ks2 using the copyright control program P. The second secret-key Ks2 used for this operation is generated in accordance with the use frequency N of the copyright control program and with the first secret-key Ks1:

$Ks2=P(N+Ks1)$.

Because the second secret-key Ks2 thus generated is based on the use frequency N of the copyright control program P and the first secret-key Ks1, the data M is encrypted by the latest second secret-key Ks2 whenever it is used:

$Cmks2=E(Ks2, M)$.

The data Cmks2 encrypted by the second secret-key Ks2 generated through the final utilization is copied to the recording medium 11 or transmitted to secondary user terminal 5 via communication network 8 together with its original data name or original data number and counter data N1.

The secondary user obtains the encrypted data Cmks2 and designates the original data name or original data number and the counter data N1 from secondary user terminal 5 to request the secondary utilization of the encrypted data Cmks2 to the copyright management center 17.

The copyright management center 17 receives the secondary utilization request of the encrypted data Cmks2, finds out the first secret-key Ks1 in accordance with the designated original data name or original data number, generates the second secret-key Ks2 in accordance with the counter data N1 and the first secret-key Ks1, and supplies the second secret-key Ks2 to secondary user terminal 5 together with the copyright control program P via communication network 8.

The secondary user receives the second secret-key Ks2, and the copyright control program P decrypts the encrypted data Cmks2 by the second secret-key Ks2 using the copyright control program P:

$M=D(Ks2, Cmks2)$ and uses the decrypted data M directly or by editing the data M.

When the data M is stored in secondary user terminal 5, copied to the recording medium 12, or transmitted to tertiary user terminal 6 via communication network 8, the data M is encrypted by the second secret-key Ks2 using the copyright control program P:

$Cmks2=E(ks2, M)$.

In this case, it is also possible to make the copyright control program P generate the third secret-key Ks3 in accordance with a use frequency N2 of the copyright control program P in secondary user terminal 5 and with the secret-key Ks2:

$Ks3=P(N2+Ks2)$.

When the data M is stored in secondary user terminal 5, copied to the recording medium 12, or transmitted to the tertiary user 6 via communication network 8, the data M is encrypted by the third secret-key Ks3 using the copyright control program P:

$Cmks3=E(Ks3, M)$.

Embodiment 8

Figure 4:
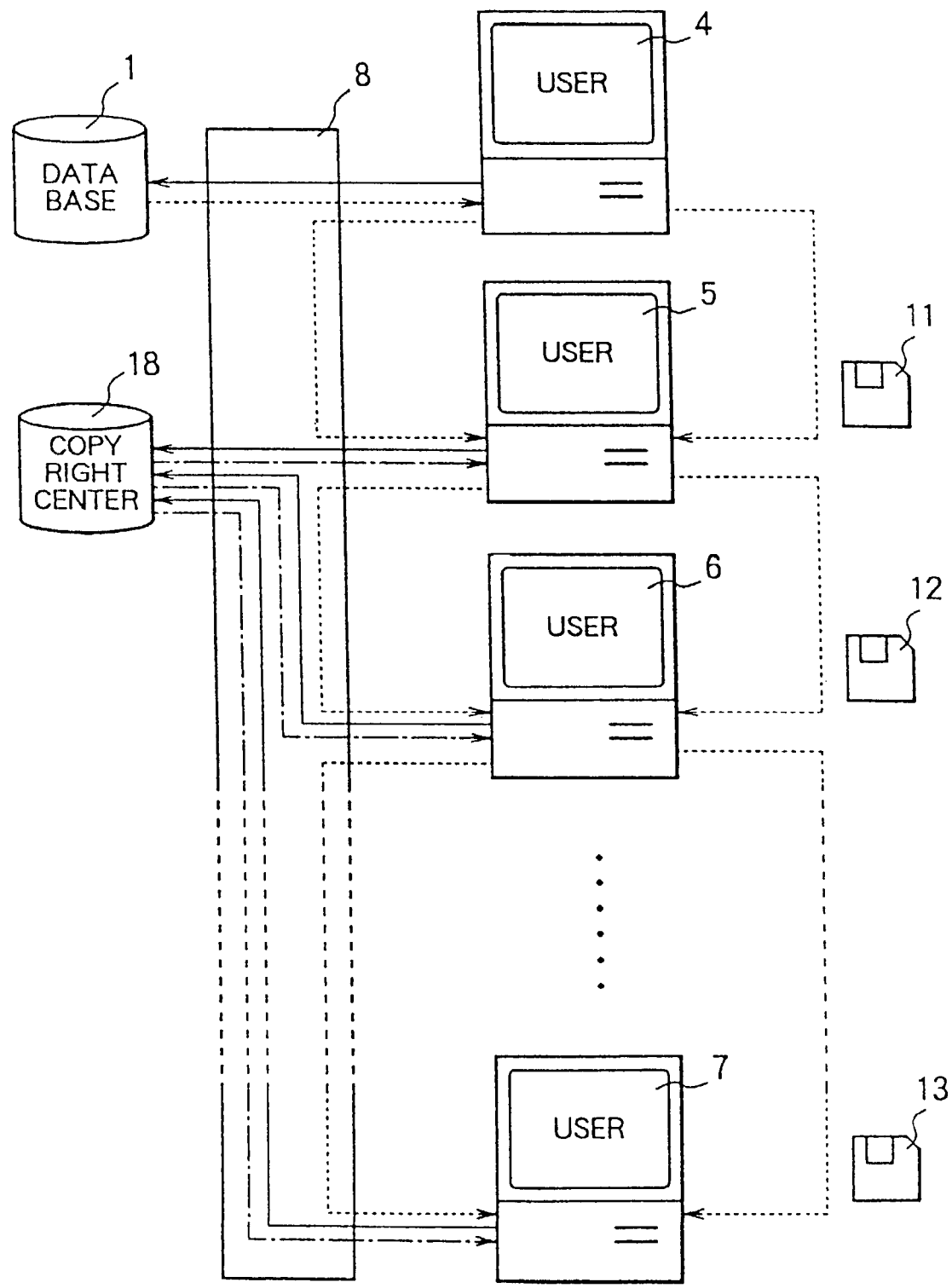
FIG. 4 illustrates a data copyright management system for embodiments 8, 9, 10 and 11 of the present invention.

FIG. 4 shows the embodiment 8 of the present data copyright management system. In this embodiment, original data is supplied one-way to a user from a single database in accordance with a request of the user. This embodiment uses a secret-key cryptosystem as its cryptosystem in which a second secret-key is generated in accordance with a first secret-key.

In FIG. 4, reference numeral 1 represents a database, 4 represents a primary user terminal, 5 represents a secondary user terminal, 6 represents a tertiary user terminal, and 7 represents an n-order user terminal. And 18 represents a copyright management center and 8 represents a communication network such as a public telephone line provided by a telephone company or a CATV line offered by a cable television enterprise.

In the above arrangement, database 1, copyright management center 18, primary user terminal 4, secondary user terminal 5, tertiary user terminal 6, and n-order user terminal 7 can be connected with each other by communication network 8.

Each user who uses this system must previously be entered in a database system, and when entered in the system, database system software is given to the user. This software includes a normal communication software such as a data communication protocol.

The database utilization software can be stored on a hard disk of a user terminal, or may be stored in a mask ROM, EPROM, or EEPROM in the user terminal.

In this system, a secret-key generation algorithm is stored in a user terminal in order to generate a secret-key from the user side. However, because the secret-key generation algorithm is not always secret, it is possible to store the algorithm in the database utilization software given to the user when the user is entered in a database system.

In case of original data provided with advertisement supplied to the user free of charge, it may not be necessary to encrypt the data. Even in this case, however, because the data has a copyright, a proper procedure must be followed to ensure copyright protection.

In FIG. 4, the broken line represents a path for encrypted data, the solid line represents a path requested from each user terminal, and the one-dot chain line represents a path through which a key for allowing data utilization and a copyright control program together with a secret-key from the copyright management center to secondary and subsequent-order user.

In FIG. 4, database 1 stores text data, graphics data or binary data, audio data, and picture data which are not encrypted. A primary user makes a request for utilization of the original data M0 from primary user terminal 4 by designating an original data name or number to database 1 via communication network 8.

Database 1 receives the utilization request of the original data M0 from primary user terminal 4, encrypts the original data M0 by the first secret-key Ks1:

Cm0ks1=E(Ks1, M0)

and supplies the copyright control program P to primary user terminal 4 together with the encrypted original data Cm0ks1 and the first secret-key Ks1.

The copyright control program P includes a crypt program having a cryptographic algorithm which generates a secret-key and decrypts or encrypts data. Further, by making the cryptographic algorithm dependent on the first secret-key Ks1, it is possible to make the copyright control program P inherent in the original data M0.

Primary user terminal 4 receives the first secret-key Ks1 and the copyright control program P together with the original data Cm0ks1 encrypted by the first secret-key Ks1, decrypts the encrypted original data Cm0ks1 by the first secret-key Ks1:

M0=D(Ks1, Cm0ks1)

and uses the decrypted original data M0 directly or data M1 as edited.

The copyright control program P generates the second secret-key Ks2 in accordance with the first secret-key Ks1:

Ks2=P(Ks1).

When the data M as decrypted original data or edited data is stored in primary user terminal 4, copied to the recording medium 11, or transmitted to secondary user terminal 5 via communication network 8, the data M is encrypted by the second secret-key Ks2 using the copyright-control program P:

Cmks2=E(Ks2, M).

The encrypted data Cmks2 is copied to the recording medium 11 or transmitted to secondary user terminal 5 via communication network 8, together with its original data name or original data number.

A secondary user obtains the encrypted data Cmks2 and makes a request for secondary utilization of the data M as original data or edited data to the copyright management center 18 from secondary user terminal 5 by designating the original data name or number.

The secondary copyright management center 18 receives the secondary utilization request of the data M, finds out the first secret-key Ks1 in accordance with the original data name or original data number to generate the second secret-key Ks2 in accordance with the first secret-key Ks1:

Ks2=P(Ks1)

and supplies the generated second secret-key Ks2 to secondary user terminal 5 together with the copyright control program P.

Secondary user terminal 5 receives the second secret-key Ks2 and the copyright control program P, decrypts the encrypted data Cmks2 by the second secret-key Ks2 using the copyright control program P:

M=D(Ks2, Cmks2)

and uses the decrypted data M directly or by editing it.

A third secret-key Ks3 is generated by the copyright control program P in accordance with the second secret-key Ks2:

Ks3=P(Ks2)

so that the data M is encrypted by the generated third secret-key Ks3 using the copyright control program P when the data M is stored in secondary user terminal 5, copied to the recording medium 12, or transmitted to tertiary user terminal 6 via communication network 8:

Cmks3=E(Ks3, M).

Embodiment 9

In embodiment 9, original data is supplied to a user from a single database in accordance with a request of the user, similarly to embodiment 8 in FIG. 4. This embodiment uses a secret-key cryptosystem and user data in addition to the first secret-key used for embodiment 8 to generate a second secret-key.

Because the system structure of this embodiment is the same as that of embodiment 8, its description is omitted.

Database 1 stores the original data M0 which is not encrypted. When a primary user accesses database 1 from primary user terminal 4, a data menu is transferred to the user. In this case, it is possible to display charge information together with the data menu.

When the primary user receives the data menu, the user retrieves the data menu to select the original data M0 and requests primary utilization of the original data M0 to database 1 by designating the original data name or the like of the selected original data M0.

In database 1 receiving the utilization request of the original data M0 from primary user terminal 4, the original data M0 is read and the original data M0 is encrypted by the first secret-key Ks1:

Cm0ks1=E(Ks1, M0)

and the copyright control program P is supplied to primary user terminal 4 together with the encrypted original data Cm0ks1 and the first secret-key Ks1.

The copyright control program P used here is common to entire database system, which includes a crypt program having a cryptographic algorithm. A crypt key is generated and data is decrypted or encrypted by this crypt program.

Primary user terminal 4 receives the first secret-key Ks1 and the copyright control program P, decrypts the encrypted original data Cm0ks1 by the first secret-key Ks1 using the copyright control program P:

M0=D(Ks1, Cm0ks1)

and uses the decrypted original data M0 or data M1 as edited.

The copyright control program P generates the second secret-key Ks2 in accordance with a primary user information Iu1:

Ks2=P(Iu1).

The second secret-key Ks2 may be generated in accordance with the first secret-key Ks1 or the primary user data Iu1 and the first secret-key Ks1 instead of the primary user information Iu1:

Ks2=P(Ks1)

Ks2=P(Ks1+Iu1).

When the data M serving as the original data M0 or edited data M1 is stored in Primary user terminal 4, copied to the recording medium 11, or transmitted to secondary user terminal 5 via communication network 8, the data M is encrypted by the second secret-key Ks2 using the copyright control program P:

Cmks2=E(Ks2, M).

The data Cmks2 encrypted by the second secret-key Ks2 is provided with the original data name or original data number and then, copied to the recording medium 11 or transmitted to secondary user terminal 5 via communication network 8.

A secondary user obtains the data Cmks2 encrypted by the second secret-key Ks2 and makes a request for secondary utilization of the data M to the copyright management center 18 from secondary user terminal 5. The user designates the original data name, or original data number and presents the uncrypted primary user information Iu1.

The copyright management center 18 receives the secondary utilization request of the data M, finds out the first secret-key Ks1 in accordance with the designated original data name or original data number, generates the second secret-key Ks2 in accordance with the presented primary user information Iu1 and the found-out first secret-key Ks1 by the copyright control program P, and supplies the key Ks2 to secondary user terminal 5 together with the copyright control program P.

The secondary user obtains the second secret-key Ks2 and the copyright control program P, decrypts the encrypted data Cmks2 by the second secret-key Ks2 using the copyright control program P in secondary user terminal 5:

M=D(Ks2, Cmks2)

and uses the decrypted data M directly or by editing the data.

When the data M is stored in secondary user terminal 5, copied to the recording medium 12, or transmitted to tertiary user terminal 6 via communication network 8, the data M is encrypted by the second secret-key Ks2 using the copyright control program P:

Cmks2=E(Ks2, M).

In this case, it is also possible to make the copyright control program P generate the third secret-key Ks3 in accordance with the primary user information Iu1, second secret-key Ks2, or primary user information Iu1 and the second secret-key Ks2, Ks3=P(Iu1)
Ks3=P(Iu1+Ks1)
Ks3=P(Ks1).

It is also possible to make the secondary user present the secondary user information Iu2 when requesting secondary utilization so that the third secret-key is generated in accordance with the secondary user information Iu2 instead of the primary user information Iu1.

The data M is encrypted by the third secret-key Ks3 using the copyright control program P:

Cmks=E(Ks3, M).

In this embodiment, the copyright control program P for generating the second secret-key Ks2 is common to any database. Therefore, in any database, the same second secret-key Ks2 is generated for the same original data as long as the primary user data Iu1 and the first secret-key Ks1 are not changed.

Embodiment 10

In embodiment 10, original data is supplied to a user from a single database in accordance with a request of the user similarly to the case of embodiment 8. This embodiment uses a secret-key cryptosystem.

This embodiment uses the use frequency of a copyright control program instead of user information adopted for generating a second secret-key in embodiment 9.

Because the system structure of this embodiment is the same as that of embodiment 8, its description is omitted.

Database 1 stores original data M0 which is not encrypted. When a primary user accesses database 1 from primary user terminal 4, a data menu is transferred to the user. In this case, charge information may be displayed together with the data menu.

When the primary user receives the data menu, the user retrieves the data menu to select the original data M0 and makes a request for the primary utilization of the original data M0 to database 1 by designating an original data name or the like via communication network 8 from primary user terminal 4.

Database 1 receives the data utilization request from a primary user, encrypts the original data M0 by a first secret-key Ks1

Cm0ks1=E(Ks1, M0)

and supplies the copyright control program P to primary user terminal 4 together with the encrypted data Cm0ks1 and the first secret-key-Ks1.

The copyright control program P includes a crypt program having a cryptographic algorithm, which generates a crypt key and decrypts or encrypts data. Further, a counter is attached to the copyright control program P to count the use frequency N of the program P or the number of use times of original data.

Further, by making the cryptographic algorithm dependent on the first secret-key Ks1, it is possible to make the copyright control program P inherent in the original data.

The primary user receives the first secret-key Ks1 and the copyright control program P, decrypts the encrypted original data Cm0ks1 by the first secret-key Ks1 using the copyright control program P M0=D(Ks1, Cm0ks1)

and uses the decrypted original data M0 directly or data M1 as edited.

To protect the copyright of data, when the data M as the original data M0 or edited data M1 is stored in primary user terminal 4, copied to the recording medium 11, or transmitted to secondary user terminal 5 via communication network 8, the data M is encrypted by the copyright control program P. In other words, a copyright control program always-runs whenever these types of utilization are made.

When the supplied copyright control program P is used, the counter in the program performs counting and the copyright control program P generates the second secret-key Ks2 in accordance with the counted value N and the first secret-key Ks1:

Ks2=P(N+Ks2).

Because the second secret-key Ks2 is based on the use frequency N of the copyright control program P, the data M is encrypted by the new second secret-key Ks2 whenever the data is used:

Cmks2=E(Ks2, M).

The data Cmks2 encrypted by the generated second secret-key Ks2 is copied to the recording medium 11 or transmitted to secondary user terminal 5 via-communication network 8 together with the original data name or original data number, the primary user information Iu1 and the counter data N.

A secondary user obtains the data Cmks2 encrypted by the second secret-key Ks2 and designates the original data name or original data number, primary user information Iu1, and counter data N to request secondary utilization of the data M to the copyright management center 18.

The copyright management center 18 receives the secondary utilization request of the encrypted data Cmks2, finds out the first secret-key Ks1 in accordance with the original data name or original data number of the data, generates a second secret-key Ks2 according to the first secret-key Ks1, and the presented primary user information Iu1 and the counter data N, and transfers the generated second secret-key Ks2 to secondary user terminal 5 together with the copyright control program P.

Secondary user terminal 5 receives the second secret-key Ks2 and the copyright control program P, decrypts the encrypted data Cmks2 by the second secret-key Ks2 using the copyright control program P:

M=D(Ks2, Cmks2)

and uses the decrypted data M directly or by editing the data.

When the data is stored in secondary user terminal 5, copied to the recording medium 12, or transmitted to tertiary user terminal 6 via communication network 8, the data is encrypted by the second secret-key using the copyright control program P. Further, it is possible that the copyright control program generates a third secret-key in accordance with the second secret-key.

Above-mentioned embodiments 1 to 10 are described with respect to using a single original data supplied from a database. However, one of the data utilization, edit operation, includes not only editing a single data but also producing new data by combining a plurality of original data obtained from the same database and producing new data by combining a plurality of original data obtained from a plurality of databases.

Embodiment 11

In embodiment 11, a primary user produces new data by combining a plurality of original data stored in a single database. That is, the primary user produces new data by using first, second, and third original data stored in the database. In this embodiment, a plurality of original data are supplied to a user from a single database in response to a request of the user similarly to the case of embodiment 8 shown in FIG. 4. This embodiment uses a secret-key cryptosystem.

Because the system structure of this embodiment is the same as that of embodiment 8, its description is omitted.

Database 1 stores original data M01, M02 and M03 which are not encrypted. When the primary user accesses database 1 from primary user terminal 4, a data menu is transferred to the user. In this case, charge information may be displayed together with the data menu.

When the primary user receives the data menu, the user retrieves the data menu to select the original data M01, M02 and M03, makes a request for supply of the data M01, M02 and M03 to database 1 via communication network 8 by designating original data names or original data numbers of the first, second and third original data M01, M02 and M03, and also presents the primary user information Iu1.

Database 1 receives the supply request of the first, second and third original data M01, M02 and M03 from the primary user, encrypts the first, second and third original data M0, M02 and M03 by first, second and third secret-keys Ks01, Ks02 and Ks03 respectively:

Cm01ks01=E(Ks01, M01)
Cm02ks02=E(Ks02, M02)
Cm03ks03=E(Ks03, M03)

and supplies the first, second and third secret-keys Ks01, Ks02 and Ks03 and the copyright control program P common to entire database and all original data to primary user terminal 4.

The copyright control program P includes a crypt program having a cryptographic algorithm, which generates a crypt key and decrypts or encrypts data.

Primary user terminal 4 receives the first encrypted original data Cm01ks01, second encrypted original data Cm02ks02, third encrypted original data Cm03ks03, first secret-key Ks01, second secret-key Ks02, third secret-key Ks03, and copyright control program P, decrypts the first, second and third encrypted original data Cm01ks01, Cm02ks02 and Cm03ks03 by the secret-keys Ks01, Ks02, and Ks03 using the copyright control program P:

M01=D(Ks01, Cm01ks01)
M02=D(Ks02, Cm02ks02)
M03=D(Ks03, Cm03ks03)

and produces new data M1 edited from the original data M01, M02 and M03.

The copyright control program P produces a fourth secret-key Ks4 in accordance with one or some of the first secret-key Ks01, second secret-key Ks2, third secret-key Ks3, and primary user data Iu1:

Ks4=P(Ks01/Ks02/Ks03/Iu1).

When the edited data M1 is stored in primary user terminal 4, copied to the recording medium 11, or transmitted to secondary user terminal 5 via communication network 8, the data is encrypted by the fourth secret-key Ks4 using the copyright control program P:

Cm1ks4=E(Ks4, M1).

The encrypted edited data Cm1ks4 is copied to the recording medium 11 or transmitted to secondary user terminal 5 via communication network 8, together with original data names or original data numbers and the primary user data Iu1.

A secondary user obtains the encrypted edited data Cm1ks4 and makes a request for secondary utilization of the data Cm1ks4 to the copyright management center 18 from secondary user terminal 5. In this case, the user designates data names or data numbers of the original data M01, M02 and M03 and presents the primary user information Iu1.

The copyright management center 18 receives the secondary utilization request of the encrypted edited data Cm1ks4 from the secondary user, finds out the first secret-key Ks01 in accordance with the data name or data number of the first original data M01, the second secret-key Ks02 in accordance with the data name or number of the second original data M02, and the third secret-key Ks03 in accordance with the data name or number of the third original data M03, generates fourth secret-key Ks4 by one or some of the found-out first secret-key Ks01, second secret-key Ks02, third secret-key Ks03 and primary user information Iu1 using common copyright control program P:

Ks4=P(Ks01/Ks02/Ks03/Iu1);

and supplies the fourth secret-key Ks4 to secondary user terminal 5 together with the common copyright control program P.

The secondary user receives the fourth secret-key Ks4 and the common copyright control program P, decrypts the encrypted edited data Cm1ks4 by the fourth secret-key Ks4 using the copyright control program P M1=D(Ks4, Cm1ks4)

and uses the decrypted edited data M1 directly or data M2 as edited.

When the edited data M1 or re-edited data M2 is stored in secondary user terminal 5, copied to the recording medium 12 or transmitted to a tertiary user terminal 6 via communication network 8, a fifth secret-key Ks5 is generated in accordance with the fourth secret-key Ks4 by the copyright control program P, and the data is encrypted by the fifth secret-key Ks5 using the copyright control program P:

Cm1ks5=E(Ks5, Cm1)
Cm2ks5=E(Ks5, Cm2).

Further, it is possible to make the common copyright control program P generate a fifth secret-key Ks5 by the fourth secret-key Ks4 for subsequent encryption or decryption by the generated fifth secret-key Ks5.

In this embodiment, a copyright control program for generating a fourth secret-key is common to any database. Therefore, in any database, the same fourth secret-key is generated for the same original data as long as primary user data and a first secret-key are not changed.

While the common copyright control program of this embodiment is supplied from the copyright management center 18, it may be stored in a ROM in a user terminal or in software for using a database.

Embodiment 12

In embodiment 12, new data is produced by combining a plurality of original data supplied from a plurality of databases in response to a user's request. This embodiment uses a secret-key cryptosystem.

Figure 5:
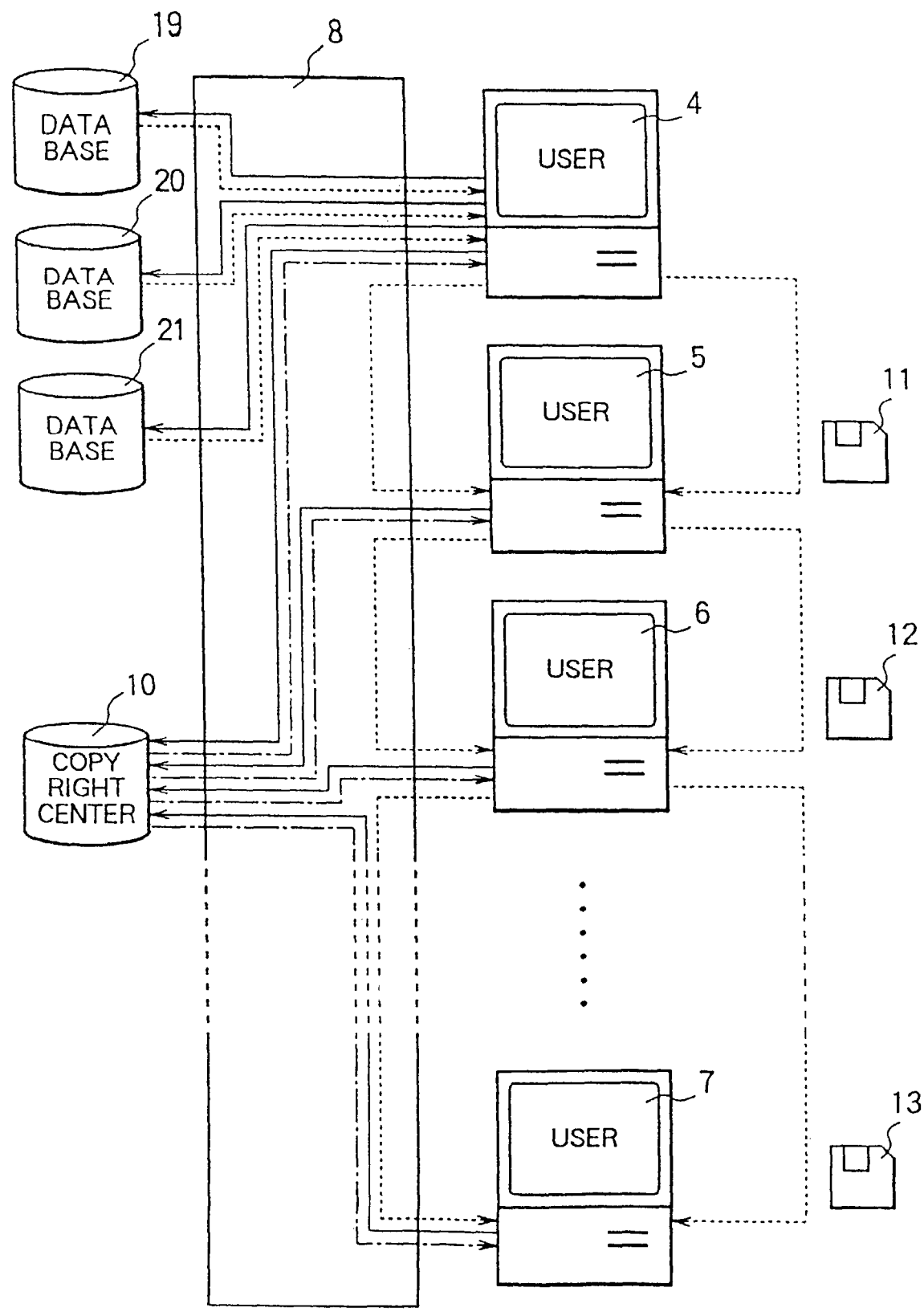
FIG. 5 illustrates a data copyright management system for embodiments 12 and 13 of the present invention.

In FIG. 5, reference numerals 19, 20, and 21 represent first, second and third databases storing text data, binary data as a computer graphics display or computer program, and audio data or picture data, 4 represents a primary user terminal, 5 represents a secondary user terminal, 6 represents a tertiary user terminal, 7 represents an n-order user terminal, 10 represents a copyright management center for managing data copyrights, and 8 represents a communication network such as a public telephone line offered by a telephone company or a CATV line offered by a cable television enterprise.

In the above arrangement, the first, second and third databases 19, 20 and 21, copyright management center 10, primary user terminal 4, secondary user terminal 5, tertiary user terminal 6, and n-order user terminal 7 can be connected with each other by communication network 8.

A user who desires to use this system must previously be entered in each database system, and when entered in the database system, database utilization software is supplied to the user. The software includes a normal communication software program such as a data communication protocol.

The database utilization software may be stored on a hard disk of a user terminal, or may be stored in a mask ROM, EPROM, or EEPROM in the user terminal.

In this system, a crypt key generation algorithm is stored in a user terminal in order to generate a secret-key from the user side. However, because the crypt key generation algorithm is not necessarily secret, it is possible to store the algorithm in each database utilization software.

In case of original data provided with advertisement supplied to the user free of charge, it may not be necessary to encrypt the data. Even in this case, however, because the data has a copyright, a proper procedure must be followed to ensure copyright protection.

In FIG. 5, the broken line represents a path for encrypted data, the solid line represents a path of requests from each user terminal to each database and copyright management center, and the one-dot chain line represents a path through which permit information corresponding to utilization requests, a copyright control program, and a crypt key are transferred from each database and copyright management center to each user terminal.

This embodiment uses a secret-key and a copyright control program which are different for each original data and are previously stored in each database and the copyright management center.

The first database 19 stores the first original data M1 which is not encrypted. When a primary user accesses the first database 19 from the first user terminal 4, a data menu is transferred to the user.

When the primary user receives the data menu, the user retrieves the data menu to select the first original data M1 and makes a request for supply of the first original data M1 to the first database 19 via communication network 8 from primary user terminal 4 by designating an original data name or original data number. In this case, the user presents the primary user information Iu1.

The first database 19 receives the utilization request of the first original data M1 from the primary user, encrypts the requested first original data M1 by first secret-key Ks1
$$Cm1ks1=E(Ks1, M1)$$
and supplies the encrypted data to primary user terminal 4.

The second database 20 stores the second original data M2 which is not encrypted. When the primary user accesses the second database 20 from primary user terminal 4, a data menu is transferred to the user.

When the primary user receives the data menu, the user retrieves the data menu to select the second original data M2 and makes a request for supply of the second original data M2 to the second database 20 via communication network 8 from primary user terminal 4 by designating an original data name or original data number. In this time, the user presents the primary user information Iu1.

The second database 20 receives the utilization request of the second original data M2 from the primary user, encrypts the requested second original data M2 by second secret-key Ks2
$$Cm2ks2=E(Ks2, M2)$$
and supplies the encrypted data to primary user terminal 4.

The third database 21 stores the third original data M3 which is not encrypted. When the primary user accesses the third database 21 from primary user terminal 4, a data menu is transferred to the user.

When the primary user receives the data menu, the user retrieves the data menu to select the third original data M3 and requests for supply of the third original data M3 to the third database 21 via communication network 8 from primary user terminal 4 by designating an original data name or original data number. In this case, the user presents the primary user information Iu1.

The third database 21 receives the utilization request of the third original data M3 from the primary user, encrypts the requested third original data M3 by the third secret-key Ks3
$$Cm3ks3=E(ks3, M3)$$
and supplies the encrypted data to primary user terminal 4.

The primary user receives the first, second, and third encrypted original data Cm1ks1, Cm2ks2 and Cm3ks3 makes a request for primary utilization of the first, second, and third encrypted original data Cm1ks1, Cm2ks2 and Cm3ks3 to copyright management center 10 via communication network 8 from primary user terminal 4 by designating original data names or numbers.

Copyright management center 10 receives the primary utilization request of the first, second and third encrypted original data Cm1ks1, Cm2ks2 and Cm3ks3 from the primary user and supplies a first copyright control program P1, a second copyright control program P2, and a third copyright control program P3 to primary user terminal 4 together with the first secret-key Ks1 as a crypt key of the first original data M1, the second secret-key Ks2 as a crypt key of the second original data M2, and the third secret-key Ks3 as a crypt key of the third original data M3.

These copyright control programs P1, P2 and P3 include a crypt program having a cryptographic algorithm respectively, which generates new secret-keys and decrypts or encrypts data.

Further, by making these cryptographic algorithms dependent on the first, second and third secret-keys Ks1, Ks2 and Ks3 respectively, it is possible to make the first, second and third copyright control programs P1, P2 and P3 inherent in the first, second and third original data M1, M2 and M3 respectively.

Primary user terminal 4 receives the first, second and third secret-keys Ks1, Ks2 and Ks3, decrypts the first, second and third original data Cm1ks1, Cm2ks2 and Cm3ks3 encrypted by these secret-keys:

M1=D(Ks1; Cm1ks1)
M2=D(Ks2, Cm2ks2)
M3=D(Ks3, Cm3ks3)

and uses the decrypted original data M1, M2, and M3 directly or by editing them.

And the first copyright control program P1 generates fourth secret-key Ks4 in accordance with the first secret-key Ks1, the second copyright control program P2 generates fifth secret-key Ks5 in accordance with the second, secret-key Ks2, and the third copyright control program P3 generates sixth secret-key Ks6 in accordance with the third secret-key Ks3:

Ks4=P1(Ks1)
Ks5=P2(Ks2)
Ks6=P3(Ks3).

When the original data M1, M2 and M3 or edited data M4, M5 and M6 are stored in primary user terminal 4, copied to the recording medium 11, or transmitted to secondary user terminal 5 via communication network 8; the first original data M1 or edited data M4 is encrypted by the fourth secret-key Ks4 using the first copyright control program P1, the second original data M2 or edited data M5 is encrypted by the fifth secret-key Ks5 using the second copyright management program P2, and the third original data M3 or edited data M6 is encrypted by the sixth secret-key Ks6 using the third copyright control program P3:

Cm1ks4=E(Ks4, M1)
Cm2ks5=E(Ks5, M2)
Cm3ks6=E(Ks6, M3)
Cm4ks4=E(Ks4, M4)
Cm5ks5=E(Ks5, M5)
Cm6ks6=E(Ks6, M6).

The original data Cm1ks4, Cm2ks5 and Cm3ks6 or edited data Cm4ks4, Cm5ks5 and Cm6ks6 encrypted by the fourth, fifth and sixth secret-keys Ks4, Ks5 and Ks6 are copied to the recording medium 11 or transmitted to secondary user terminal 5 via communication network 8 together with the first, second and third original data names or original data numbers and the primary user data Iu1.

For secondary user terminal 5 receiving the first, second and third encrypted original data Cm1ks4, Cm2ks5 and Cm3ks6 or the encrypted edited data Cm4ks4, Cm5ks5 and Cm6ks6, secondary utilization of the first, second and third original data M1, M2 and M3 or edited data M4, M5 and M6 is requested to copyright management center 10 by designating the original data names or original data numbers.

Copyright management center 10 receives the secondary utilization request of the first, second and third original data M1, M2 and M3 or the edited data M4, M5 and M6 from secondary user terminal 5 and finds out the first secret-key Ks1 and the first copyright control program P1 in accordance with the first original data name or number, the second secret-key Ks2 and the second copyright control program P2 in accordance with the second original data name or number and the third secret-key Ks3 and the third copyright control program P3 in accordance with the third original data name or number, wherein the first copyright control program P1 generates the fourth secret-key Ks4 from the first secret-key Ks1, the second copyright control program P2 generates the fifth secret-key Ks5 from the second secret-key Ks2 and the third copyright control program P3 generates the sixth secret-key Ks6 from the third secret-key Ks3:

Ks4=P(Ks1)
Ks5=P2(Ks2)
Ks6 P3(Ks3);

Copyright management center 10 supplies these secret-keys to secondary user terminal 5 together with the first, second and third copyright control programs P1, P2 and P3.

In secondary user terminal 5 receiving the fourth, fifth and sixth secret-keys Ks4, Ks5 and Ks6 and the first, second and third copyright control programs P1, P2 and P3, the encrypted first original data Cm1ks4 or edited data Cm4ks4 is decrypted by the fourth secret-key Ks4 using the first copyright control program P1, the encrypted second original data Cm2ks5 or edited data Cm5ks5 is decrypted by the fifth secret-key Ks5 using the second copyright control program P2, and the encrypted third original data Cm3ks6 or edited data Cm6ks6 is decrypted by the sixth secret-key Ks6 using the third copyright control program P3:

M4=D(Ks4, Cmks4)
M5=D(Ks5, Cm5ks5)
M6=D(Ks6, Cm6ks6)

and the decrypted data M4, M5 and M6 are used directly or by editing them.

When the first, second and third original data M1, M2 and M3 or edited data M4, M5 and M6 are stored in secondary user terminal 5, copied to the recording medium 12, or transmitted to tertiary user terminal 6 via communication network 8, the first original data M1 or edited data M4 is encrypted by the fourth secret-key Ks4 using the first copyright control program P1, the second original data M02 or edited data M5 is encrypted by the fifth secret-key Ks5 using the second copyright control program P2, and the third original data M3 or edited data M6 is encrypted by the sixth secret-key Ks6 using the third copyright control program P3.

In this case, it is also possible to make the first copyright control program P1 generate a seventh secret-key Ks7 in accordance with the fourth secret-key Ks4, the second copyright control program P2 generate an eighth secret-key Ks8 in accordance with the fifth secret-key Ks5 and the third copyright control program P3 generate a ninth secret-key Ks9 in accordance with the sixth secret-key Ks6:

Ks7=P1(Ks4)
Ks8=P2(Ks5)
Ks9=P3(Ks6)

When the first, second and third original data M1, M2 and M3 or edited data M4, M5 and M6 are stored in secondary user terminal 5, copied to the recording medium 12, or transmitted to tertiary user terminal 6 via communication network 8, the first, second and third copyright control programs P1, P2 and P3 encrypt the first, second and third original data M1, M2 and M3 or the edited data M4, M5 and M6 by the seventh, eighth and ninth secret-keys Ks7, Ks8 and Ks9:

Cm1ks7=E(Ks7, M1)
Cm2ks8=E(Ks9, M2)
Cm3ks9=E(Ks9, M3)
Cm4ks7=E(Ks7, M4)
Cm5ks8=E(Ks8, M5)
Cm6ks9=E(Ks9, M6)

Embodiment 13

In embodiment 13, new data is produced by using a plurality of original data supplied from a plurality of databases in response to a user's request, similar to embodiment 12. This embodiment uses a secret-key cryptosystem.

The use frequency of copyright control programs is used to generate a crypt key for encryption/decryption, similar to the embodiments 7 and 11.

In this embodiment, a counter is attached to a copyright control program, which counts the service frequency of the program or the number of times of using original data. The fourth, fifth and sixth secret-keys Ks4, Ks5 and Ks6 are generated by the counter value N.

A secondary user presents the counter value N together with the original data name or original data number of each original data and primary user data to request secondary utilization of data to copyright management center 10.

Copyright management center 10 receives the secondary utilization request of data, finds out the first, second and third secret-keys Ks1, Ks2 and Ks3 in accordance with the original data names or original data numbers, generates fourth, fifth and sixth secret-keys Ks4, Ks5 and Ks6 by the first, second and third secret-keys Ks1, Ks2 and Ks3 for each data, the primary user information Iu1 and the first, second and third counter values N1, N2 and N3 using the first, second and third copyright control programs P1, P2 and P3, and supplies the generated fourth, fifth and sixth secret-keys Ks4, Ks5 and Ks6 to secondary user together with the fourth, fifth and sixth copyright control programs P1, P2 and P3.

Because the system structure of embodiment 13 is the same as that of embodiment 12 except the above point, its detailed description is omitted.

Embodiment 14

When a copy of original data obtained by a primary user is directly supplied to a secondary user, a copyright of the primary user is not affected on the data because the data is not provided with any value. However, when new data is produced from obtained original data, that is, when new data is produced from single original data or from a plurality of original data, a secondary copyright of the primary user; i.e., secondary exploitation right in editing the data is affected on the new data.

Because the copyright of the original copyright owner also applies for the original data used for edit, the original copyright of the original data of an author and the secondary copyright of the primary user who has edited data apply for the edited data.

As a copyright is a right having essential elements of a personal right, authors strongly insist on owning the copyright in many cases. Therefore, even when original data is edited, it is preferable that the original data or its copyright owner can easily be specified from the edited data.

In the data copyright management systems described in embodiments 1 to 13, the copyrights of data are managed by encrypting original data or edited data. For these systems, however, the copyright of data is managed without identifying original data or edited data, in the whole data or separating an original data part from an edited part in the whole edited data. Therefore, it is impossible to specify original data or owner from edited data.

Embodiment 14 makes it possible to separate original data for which only the original copyright applies from the edited data in which a secondary exploitation right also applies in addition to the original copyright, and manage the original copyright and the secondary exploitation right.

Because data is edited by using an editor program, thereby altering original data, the edited data can be reproduced as the original data and edit contents (further, the editor program when necessary) are specified. In other words, unless the original data and the edit contents (further, the editor program when necessary) are specified, it is impossible to reproduce the edited data.

In embodiment 14, the secondary exploitation right described is managed by specifying original data and edit contents (further, an editor program when necessary) and managing them.

To produce new data from single original data, there can be different cases: first, edited data [A'] is obtained by altering original data A; second, edited data [A+X] is obtained by adding data X to the original data A by a primary user; third, edited data [A"] is obtained by dividing the original data A into original data elements A1, A2, A3, . . . and changing the arrangement of the elements to such as A3, A2 and A1; and fourth, edited data [A1+X1+A2+X2+A3+X3 . . . ] is obtained by dividing the original data A into original data elements A1, A2, A3 . . . , also dividing the data X of the primary user into X1, X2, X3, . . . and arranging these elements.

In these cases, alteration of original data, change of original data arrangement, combination of the original data with primary user data, and division of the original data and combination of it with the primary user data can respectively be provided with a secondary exploitation right, which needs to be protected. The original copyright of the primary user, of course, is retained in the data X added by the primary user.

To produce new data by combining a plurality of original data, there are different methods: first, edited data [A+B+C . . . ] is obtained by simply combining original data A, B, C, . . . ; second, edited data such as [A+X] is obtained by adding data X to the original data A, B, C, . . . ,; third, edited data [A1+B1+C1+ . . . +A2+B2+C2+ . . . +A3+B3+C3+ . . . ] is obtained by dividing the original data A, B, C, . . . into original data elements A1, A2, A3, . . . , B1, B2, B3, . . . and C1, C2, C3, . . . , combining them, and changing their arrangements; and fourth, edited data [A1+B1+C1+X1+ . . . +A2+B2+C2+X2+ . . . +A3+B3+C3+X3+ . . . ] is obtained by dividing the original data A, B, C, . . . into original data elements A1, A2, A3, . . . , B1, B2, B3, . . . , and C1, C2, C3, . . . , combining the elements with primary user data X1, X2, X3, . . . , and changing their arrangements.

Also in these cases, combination of a plurality of original data, combination of a plurality of original data with primary user data, division of a plurality of original data and change of the arrangements, and combination to a plurality of divided original data with the primary user data can respectively be provided with a secondary exploitation right, which needs to be protected. Also, the original copyright of the primary user, of course, is retained in the data X1, X2, X3, . . . added by the primary user.

Figure 6:
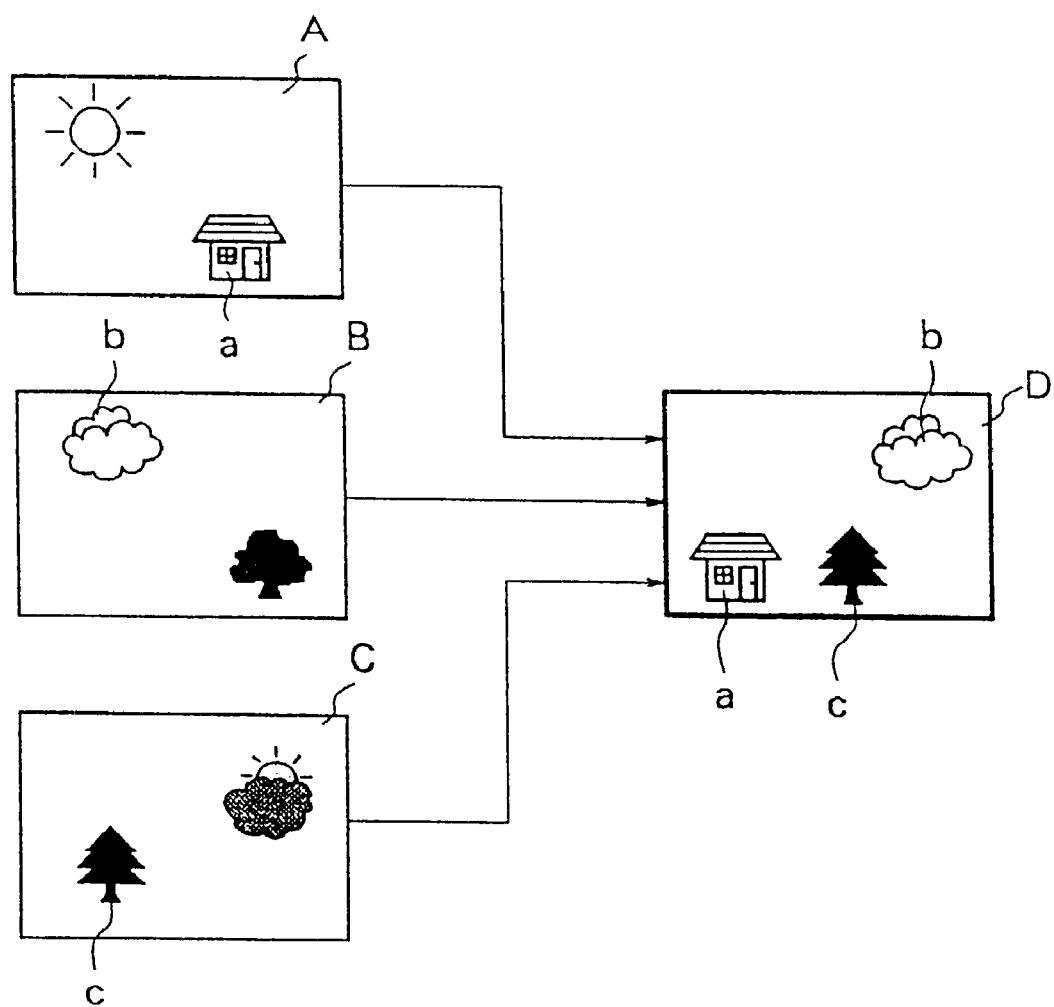
FIG. 6 is an illustration for data editing.

FIG. 6 shows an example for producing new data D by using a plurality of original data A, B and C. This method is known as the cut-and-paste technique in which data is edited by extracting (cutting out) elements "a", "b" and "c" from original data A, B and C and attaching (pasting) the extracted elements "a", "b" and "c" to form a piece of data D.

While it is clear that original data and primary user data are data, the editing process: alteration of original data, arrangement change of original data, combination of original data with primary user data, division of original data and combination with primary user data, combination of a plurality of original data each other, combination of a plurality of original data with primary user data, division and arrangement change of a plurality of original data, and combination of a plurality of divided original data with primary user data, are also data.

In the above described embodiments 1 to 13, the copyright of data are managed by encrypting original data or edited data. Further, noticing that editing process of data, such as arrangement of original data and process of editing, is also data, the secondary exploitation right on edited data can be protected by managing the primary copyright of the author on the original data and secondary copyright of the primary user on editing process data.

Editing process data or editor program may be called as scenario. That is, it is possible to ensure to manage the copyrights of the edited data as well as of the original data, if the edited data is constituted with original data, primary user data and editing process data, and thus, these original data, primary user data and editing process data are managed by the data copyright management system described in embodiments 1 to 13. In this case, an editor program used for editing data may be managed by the data copyright management system, if necessary.

While the data edit operation of original data can be performed by using an editor program corresponding to the original data, by handling the original data as object-oriented software which has recently been focused on, it is possible to facilitate further editing of data and manage more preferably copyrights of data.

Further, by adopting agent-oriented software, a user can synthesize data with little labor. The agent-oriented software, unlike the conventional one, is a program having autonomy, flexibility and cooperativeness, which is able to meet a user's request with its characteristics of autonomy, flexibility and cooperativeness in accordance with only a general instruction of the user without specifically giving every operation instructions to the software.

By incorporating the agent program into a basic system of a data copyright management system so that the program monitors the database utilization of a user and information obtained through the monitoring is collected at the database or the copyright management center, it is possible to monitor the database utilization condition of the user at the database side or the copyright management center side and achieve more accurate copyright management. As described, these agent program and data can also be protected and, therefore, are encrypted like original data.

Embodiment 15

The works with a copyright include those which make use of the copyright and those which do not make use of the copyright. The works with no copyright include those to which no copyright is given by a law and those whose copyright duration has expired. All works except those which have no existing copyright have a copyright, and they are normally provided with a mark for indicating the copyright which prevents infringement of the copyright.

The same is applied to data. In case of data with a copyright, indication of a copyright or an author mark is given to the data to be used or to the file header of the data in order to prevent the infringement of the copyright.

Further, by adding the copyright flag indicative of the data with copyright to the file, and by identifying the copyright flag in the user terminal, it is possible to prevent the infringement of the data copyright.

However, even if the indication on a copyright is given to data, when a user disregards the copyright of the data work, that results in the infringement of the copyright. To prevent the above case, in the above mentioned embodiments, data is encrypted and a decryption key for decrypting the encrypted data is managed so as to perform encryption or decryption by a crypt key different from the decryption key when decrypted data is stored, copied, or transmitted.

Even in this case, there may be the possibility of storing, copying, or transferring data without using a cryptographic key different from a decryption key by transferring the data to a memory other than the main memory of a user terminal while the data is present in the main memory of the user terminal.

To prevent the above case, it is the best to incorporate data copyright utilization software into a basic system of a user terminal, indicate the file of a data work to which a copyright is given with an attribute for making use of the copyright, make the basic system of the user terminal monitor the attribute for using the copyright of the data work, and make the data copyright utilization software manage the data work having the copyright using attributes.

The basic system means a software operating system such as DOS when the user terminal is a computer such as a personal computer or a hardware operating system stored in a ROM when the user terminal is a portable information terminal or STB (set top box).

To more completely manage a data copyright with the operating system, it is preferable to incorporate the data copyright utilization software into a higher-level operating system.

Every processing and every data in the user terminal is under control of an operating system. In other words, the operating system can store every processing and data information in the user terminal. Therefore, it is possible to make the copyright control program automatically manage the data copyright in accordance with a data utilization condition held by the operating system without resorting to a user instruction. According to the above arrangement, a user can easily use a data copyright and the data copyright can more completely be managed.

Further, it is desirable that the copyright control program for managing the crypt key, data copyright information, the copyright label or the like is kept in a system area controlled by the operating system itself; i.e., the system area the user program cannot access.

Even in this case, however, if part of a data work is extracted and used, it is difficult to manage the data copyright. Therefore, when an operating system detects such a situation, it is possible to manage the copyright of the extracted part of the data by configuring a system so as to add copyright information and the copyright using attributes owned by original data to the extracted part of the data by the copyright control program.

Further, to allow the extracted data to inherit the copyright of the original data work, a "has-a" link, which is a parent and child relationship, is formed between the extracted data and the original data work with the copyright control program.

With such a configuration, it is possible to allow the new data to inherit the copyright of each original data work in the case where the user extracts and incorporates his own desired portion from a plurality of copyright data to create new data.

Embodiment 16

Because a copyright is a kind of property right, it is a matter of course that the charges for using the copyright occurs. Further, services such as offering of a secret-key and a copyright control program should be performed for charge.

The simplest method for paying these charges is a combination of a bill and payment. However, this method is complex in its operation and further may cause a trouble such as nonpayment even though the charge for using a copyright is directly paid.

There is a charge collection substitution method performed by, for example, a communication line enterprise, which is simple and has only a small risk of nonpayment because charges are collected by the communication line enterprise. However, it is necessary to pay a commission for charge collection substitution because charges are not directly collected.

To solve the above problem, there is a method for using digital cash. The digital cash is digital data used instead of cash in a computer connected to a communication network, which is encrypted and used.

Embodiment 17

Further, the configuration of the data copyright management system described above can be applied not only to the data distribution but also to the distribution of the digital cash.

The digital cash system which has been proposed so far is based on a secret-key cryptosystem. The encrypted digital cash data is transferred from a bank account or a cash service of a credit company, and is stored in the IC card so that a terminal device for input/output is used to make a payment. The digital cash system which uses the IC card as a cash-box can be used at any place such as shops or the like as long as the input/output terminal is available. However, the system cannot be used at places such as homes or the like where no input/output terminal is available.

Since the digital cash is an encrypted data, any device can be used as the cash-box which stores digital cash data, in addition to the IC card, as long as the device can store encrypted data and transmit the data to the party to which the payment is made. As a terminal which can be specifically used as the cash-box, there are personal computers, intelligent television sets, portable telephone sets such as personal digital assistant (PDA), personal handyphone system (PHS), intelligent telephone sets, and PC cards or the like which has the input/output function.

In transactions where such terminals are used as a cash-box for digital cash, the digital cash system can be actualized by replacing in the configuration of the data copyright control system, database 1 with a customer's bank, a first user terminal 4 with a customer, the second user terminal 5 with a retailer, copyright management center 18 with a retailer's bank and a third user terminal 6 with a wholesaler or a manufacturer.

Further, it is desirable that the digital cash is processed as an object associated with data and functions instead of being simple data.

In handling digital cash, there are a common digital cash form, an unentered digital cash form private for an owner, an entry column in the digital cash form private for the owner, digital cash data showing an amount of money, an instruction of handling digital cash, and a digital cash form private for the owner in which an amount of money is entered. In an object-oriented programming, the concepts such as an object, a class, a slot, a message and an instance are used.

In the corresponding relations, the common digital cash form becomes an object, the unentered digital cash form private for an owner becomes a class, the entry column of a digital cash form private for the owner becomes a slot, the instruction of handling digital cash becomes a message and the digital cash form private for the owner in which an amount of money is entered becomes an instance. Digital cash data comprising the amount of money and the like is used as an argument. Then, the data is transferred and stored in a slot which is referred to as an instance variable by the message so that a new instance is made which is digital cash in which the amount of money is renewed.

Figure 7:
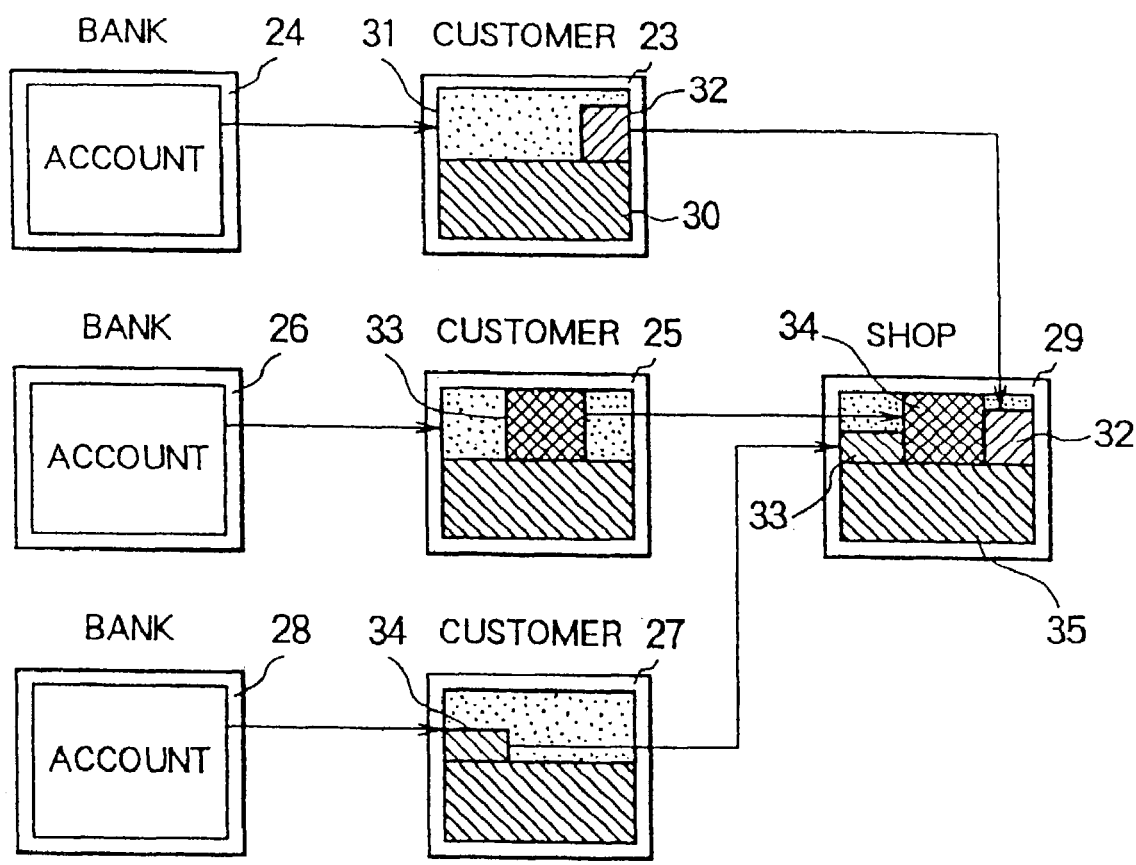
FIG. 7 is an illustration showing a digital cash system.

The digital cash which constitutes an object will be explained by using FIG. 7. In FIG. 7, reference numerals 23, 25 and 27 represent a digital cash form private for the customer in which the amount of money stored in a customer terminal is entered, 29 represents a digital cash form private for the retail shop in which the amount of money stored in a retail shop terminal is entered, and 24, 26 and 28 represents accounts of each customer's bank.

Customer 23 draws out necessary amount of money from the account 24 to use the digital cash, and transfers the data 31 of the digital cash to the digital cash form 23 which is stored in the terminal. In this case, residual amount data 30 of the digital cash is usually entered in the digital cash form 23. The digital cash form is not a class but an instance. The drawn out data 31 of the digital cash is transferred as an argument to the slot which is an entry column of the digital cash form 23 with the message instructing the addition to the residual amount data 30 of the digital cash. Then the drawn out data 31 of the digital cash is added to the residual amount data 30 of the digital cash in the digital cash form 23 so that a new instance is created in which the amount of money in the entry column of the digital cash form 23 is changed.

In the case where the customer makes a payment to the retail shop, the payment data 32 of the digital cash which corresponds to the paid amount is transferred as an argument to the slot which is an entry column of the digital cash form 23 with the message instructing the subtraction from the amount in the entry column of the digital cash form 23. Then payment data 32 of the digital cash is subtracted from the residual amount data 30 and the drawn out data 31 in the digital cash form 23 so that a new instance is created in which the amount of money in the entry column of the digital cash form 23 is changed.

Further, the payment data 32 of the digital cash is transferred to the digital cash form 29 private for the retail shop.

A similar withdrawal processing and payment processing are performed by digital cash forms 25 and 27 for other customers. The payment data 33 of the digital cash is transferred from the digital cash form 25, and the payment data 34 of the digital cash is transferred from the digital cash form 27 to the digital cash form 29 private for the retail shop.

In the case of the digital cash 29 private for the retail shop, the residual amount data 35 of the digital cash is usually entered. The payment data 32 of the digital cash, the payment data 33 of the digital cash, and the payment data 34 of the digital cash are transferred as arguments to the slot which is an entry column of the digital cash form 29 with the message instructing the addition to the residual amount data 35 of the digital cash so that the payment data 32, 33 and 34 of the digital cash are added to the residual amount data 35 of the digital cash, and a new instance is created in which the amount of money in the entry column of the digital cash form 29 is changed.

In a normal object-oriented programming, it is impossible that an argument is transferred to a slot with the message so that a new instance is created and the newly created instance as a whole is transferred. However, in the case of the digital cash, since the cryptosystem is used for security, an instance can be created in which the payment data of the digital cash is entered at the payer. This instance can be encrypted and transferred to the payee.

An embodiment of the transaction system will be explained in which the digital cash is transferred via a communication network by using FIG. 8. The embodiment is a modification of embodiment 9 by using a system shown in FIG. 4. In FIG. 4, reference numeral 36 represents a customer, 37 a bank of customer 36, 38 a retail shop, 39 a bank of retail shop 38, 40 a manufacturer, 41 a bank of manufacturer 40, 8 a public line provided by a communication enterprise or a communication network such as CATV line provided by a cable television enterprise. Customer 36, customer's bank 37, retail shop 38, retail shop's bank 39, manufacturer 40, manufacturer's bank 41 can be mutually connected with communication network 8. In this system, customer 36 can use cash service offered by a credit company other than banks and he can also interpose appropriate number of wholesalers between the retail shop and the manufacturer.

In addition, 42 and 43 are either IC cards or PC cards in which digital cash data is stored. The cards are used when the communication network is not used.

Figure 8:
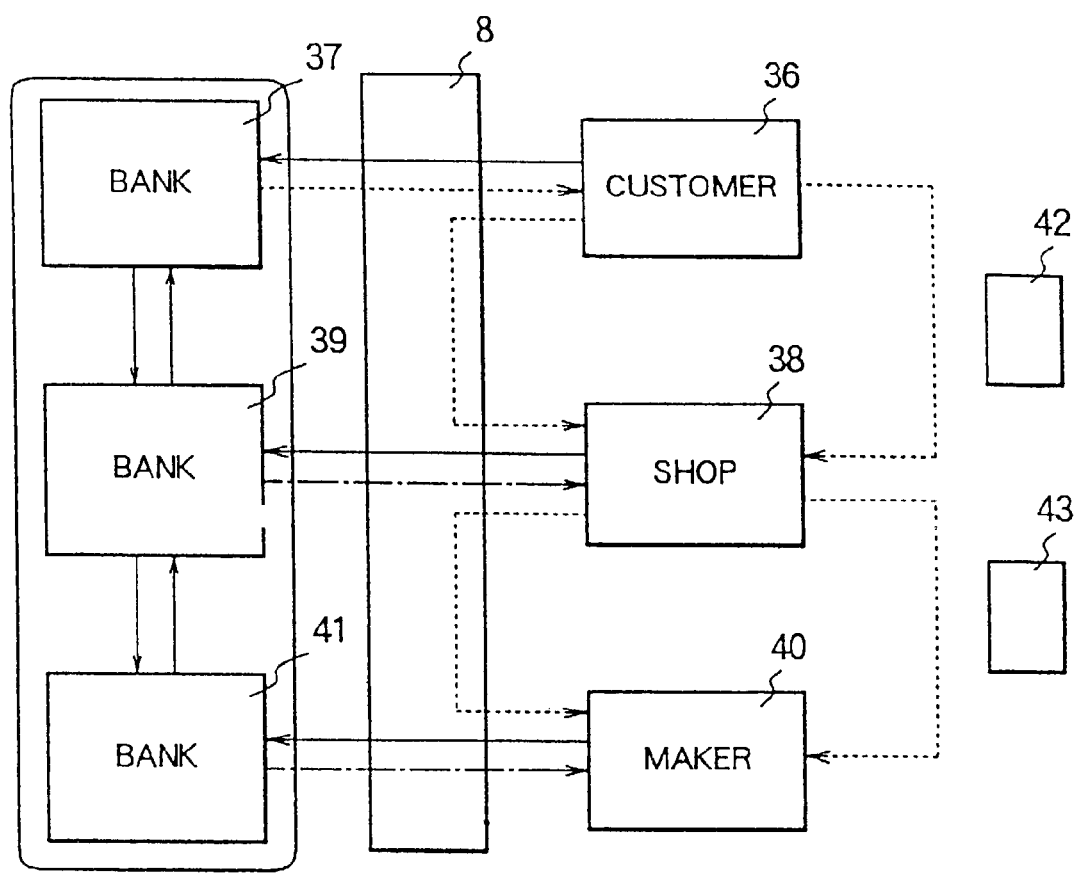
FIG. 8 illustrates a digital cash system for embodiments 17 and 18 of the present invention.

In FIG. 8, the broken line represents a path of encrypted digital cash data, the solid line represents a path of requests from the customer, the retail shop or the manufacturer, and the one-dot chain line represents a path of the secret-key from each bank.

Further, in this embodiment, the first secret-key prepared by customer's bank 37, the second secret-key generated by the customer, the third secret-key generated by the retail shop, and the fourth secret-key prepared by the manufacturer are used as crypt keys.

In this embodiment, customer's bank 37, retail shop's bank 39, and manufacturer's bank 41 are explained as separate entities. These can be considered as a financial system as a whole.

The digital cash management program P for encrypting and decrypting the digital cash data is preliminary distributed to customer 36 and is stored in the user terminal. Further, it is possible to transfer the digital cash management program P together with data every time a transaction with the bank is executed. Further, it is desirable to install the common digital cash programs P in all banks.

Customer 36 uses the user terminal to designate the amount of money via communication network 8 to request a withdrawal from the account of customer's bank 37 to the bank. At this time, the terminal presents customer information Ic.

Customer's bank 37 which receives the customer's request of withdrawal from the account selects or generates the first secret-key Ks1 so that the digital cash data M0 of the amount is encrypted by the first secret-key Ks1:

CmOks1=E(Ks1, M0)

and the encrypted digital cash data CmOks1 and the first secret-key Ks1 for a decrypting key are transferred to customer 36, and the customer information Ic and the first secret-key Ks1 are stored.

In this case, the first secret-key Ks1 can be selected from what is preliminary prepared by customer's bank 37, and also may be generated by presentation of the customer information Ic at the time of withdrawal of the customer using the digital cash management program P on the basis of the customer information Ic:

Ks1=P(Ic).

In this manner, the first secret-key Ks1 can be private for customer 36. At the same time, it is not necessary to transfer the first secret-key Ks1 to customer 36 so that the security of the system can be heightened. Further, the first secret-key Ks1 can be generated on the basis of the bank information Ibs of customer's bank 37 or on the basis of the bank information Ibs and the date of key generation.

Customer 36 to which the encrypted digital cash data CmOks1 and the first secret-key Ks1 are transferred generates the second secret-key Ks2 according to one or both of the customer information Ic and the first secret-key Ks1 using the digital cash management program P:

Ks2=P(Ic)

The generated second secret-key Ks2 is stored in the user terminal.

Further, customer 36 uses the secret-key Ks1 to decrypt the encrypted digital cash data CmOks1 with the digital cash management program P:

MO=D(Ks1, CmOks1)

and the content is confirmed. When the decrypted digital cash data MO whose content is confirmed is stored in the user terminal which is a cash-box, the generated second secret-key Ks2 is used to encrypt the content by the digital cash management program P:

CmOKs2=E(Ks2, MO).

The first secret-key Ks1 is disused at this time.

Customer 36 who wishes to buy an article from retail shop 38 decrypts the encrypted digital cash data CmOks2 which is stored in the user terminal as a cash-box by the digital cash management program P by using the second secret-key Ks2:

MO=D(Ks2, CmOks2)

and the digital cash data M1 which corresponds to the necessary amount of money is encrypted by the second secret-key ks2 using the digital cash management program P:

Cm1ks2=E(Ks2, M1)

and then, the payment is made by transmitting the encrypted digital cash data Cm1ks2 to the user terminal as a cash-box of retail shop 38 via communication network 8.

At this time, the customer information Ic is also transmitted to the user terminal of retail shop 38.

Further, the residual amount digital cash data M2 is encrypted by the second secret-key Ks2 using the digital cash management program P:

Cm2ks2=E(Ks2, M2)

and stored in the user terminal of customer 36.

Retail shop 38 to which the encrypted digital cash data Cm1ks2 and the customer information Ic are transferred stores the transferred encrypted digital cash data Cm1ks2 and customer information Ic in the user terminal. At the same time, the customer information Ic is presented to retail shop's bank 39 via communication network 8 for confirming the content and the transmission for decryption key is requested.

Retail shop's bank 39 which is requested by retail shop 38 to transmit the second secret-key Ks2 transmits the request of the transmission of the second secret-key Ks2 and the customer information Ic to customer's bank 37.

Customer's bank 37 which is requested to transmit the second secret-key Ks2 from retail shop's bank 39 generates the second secret-key Ks2 according to the customer information Ic by the digital cash management program P in the case where the second secret-key Ks2 is based only on the customer information Ic, or generates the second secret-key Ks2 according to the customer information Ic and the first secret-key Ks1 by the digital cash management program P in the case where the second secret-key Ks2 is based on the customer information Ic and the first secret-key Ks1, and transmits the generated second secret-key Ks2 to shop's bank 39.

Retail shop's bank 39 to which the second secret-key Ks2 is transmitted from the customer's bank 37 transmits the second secret-key Ks2 to retail shop 38 via communication network 8. Retail shop 38 to which the second secret-key Ks2 is transferred decrypts the encrypted digital cash data Cm1ks2 by the second secret-key Ks2 using the digital cash management program P:

M1=D(Ks2, Cm1ks2)

After confirming the amount of money, retail shop 38 transfers the article to customer 36.

In this case, retail shop 36 can directly request the transfer of the second secret-key Ks2 to customer's bank 37 instead of retail shop's bank 39.

In cases where the digital cash received by retail shop 38 is deposited in the account of retail shop's bank 39, the customer information Ic is transferred to retail shop's bank 39 together with the encrypted digital cash data Cm1ks2 via communication network 8.

Retail shop's bank 39 to which the encrypted digital cash data Cm1ks2 and the customer information Ic are transferred requests the transfer of the second secret-key Ks2 to customer's bank 37 by transmitting the customer information Ic.

Customer's bank 37, which is requested to transfer the second secret-key Ks2 from retail shop's bank 39, generates the second secret-key Ks2 according to the customer's information Ic by the digital cash management program P when the second secret-key Ks2 is only based on the customer's information Ic, or generates the second secret-key Ks2 according to the customer's information Ic and the first secret-key Ks1 by the digital cash management program P when the second secret-key Ks2 is based on the customer's information Ic and the first secret-key Ks1, then the generated second secret-key Ks2 is transferred to retail shop's bank 39.

Retail shop's bank 39, to which the second secret-key Ks2 is transferred from customer's bank 37, decrypts the encrypted digital cash data Cm1ks2 by the second secret-key Ks2 using the digital cash management program P:

M1=D(Ks2, Cm1ks2)

and the decrypted digital cash data M1 is deposited in the bank account of retail shop 39.

In the general trade system, retail shop 38 stocks products from manufacturer 40 or from the whole sale shops which come between retail shop 38 and the manufacturer 40. Then retail shop 38 sells the products to customer 36. Consequently, a transaction form is present between customer 36 and retail shop 38 just as between retail shop 38 and manufacturer 40.

The handling of the digital cash between retail shop 38 and manufacturer 40 is not basically different from the handling of the digital cash which is carried out between customer 36 and retail shop 38. Therefore, the explanation will be omitted for the sake of clarity.

In this digital cash system, the digital cash is handled through bank. As information such as the processed amount of the digital cash, date, and the secret-key demanding party information with respect to the handling of the digital cash is stored in the customer's bank, the residual amount and usage history can be obtained.

Even in the case where the user terminal which is a cashbox storing the digital cash data cannot be used owing to the loss or the breakage, it is possible to reissue the digital cash on the basis of the residual amount and usage history maintained in the customer's bank.

It is desirable to add a digital signature to the digital cash data for improve the security of the digital cash. In this embodiment, digital cash is added by the customer's information which may be accompanied by digital signature. Therefore, the digital cash in the embodiment can also have a function of settlement system for checques drawn by customers.

Also this system can be applied to various systems such as a negotiation of a draft by a letter of credit and a bill of lading in the international trading, which have been executed by documents.

Embodiment 18

The digital cash in the digital cash system which is explained in embodiment 17 is always handled through bank. However, since it is possible to handle the digital cash without bank intervention, the digital cash system in which the bank does not intervene will be explained.

In the digital cash system, a public-key and a private-key are used as crypt keys for encrypting the digital cash data. The secret-key ks and customer information Ic used in embodiment 17 is not used. Consequently, in this digital cash system, the digital cash is used in the same form as money.

Since other points are not different from the system configuration shown in embodiment 17, concrete explanation is omitted.

The party which receives the digital cash from a bank, a customer, a retail shop or a manufacturer with respect to this digital cash system prepares the public-key and the private-key. The public-key can be preliminary sent to the party which is scheduled to make a payment, or can be sent to the party before a transaction is executed. Here an explanation is made on the supposition that the key is preliminary distributed.

Customer 36 requests to customer's bank 37 for withdrawing the money from the bank account via communication network 8 from a user terminal, by indicating an amount of the money.

Customer's bank 37 which receives the request for withdrawing money from customer 36 encrypts the digital cash data Mo of the amount of money drawn by a customer public-key Kbc which is preliminary sent, using the digital cash management program P Cm0kbc=E(Kbc, MO)

and transfers the encrypted digital cash data CmOkbc to customer 36.

Customer 36 to which the encrypted digital cash data CmOkbc is transferred decrypts the digital cash data by the customer private-key Kvc which corresponds to the customer public-key Kbc using the digital cash management program P:

M0=D(Kvc, Cm0kbc)

Customer 36 confirms the content and changes the residual amount to M2(=MO+M1) in the case where there is a residual amount data M1 in the terminal. Then, the digital cash data M2 the amount of which is changed is encrypted with the customer public-key Kbc with the digital cash management program P:

Cm2kbc=E(Kbc, M2)

and stored in the terminal.

Customer 36 who wishes to buy products from retail shop 38 decrypts the encrypted digital cash data Cm2Kbc stored in the terminal by the customer private-key Kvc using the digital cash management program P:

M2=D(Kvc, Cm2kbc)

and encrypts the digital cash data M3 corresponding to the required amount of money with the digital cash management program P by the retail shop public-key Kbs which is preliminary sent:

Cm3kbs=E(Kbs, M3)

The payment is made by transferring the digital cash data to the terminal of retail shop 38 via communication network 8.

Further, the residual amount digital cash data M4(=M2−M3) is encrypted by the customer public-key Kbc using the digital cash management program P:

Cm4kbc=E(Kbc, M4)

and stored in the terminal.

Retail shop 38 to which the encrypted digital cash data Cm3Kbs is transferred decrypts the digital cash data with the digital cash management program P by the retail shop private-key Kvs corresponding to the retail shop public-key Kbs:

M3=D(Kvs, Cm3kbs)

Retail shop 38 confirms the content and changes the residual amount data to M6(M5+M3) in the case where the residual amount data M5 is present in the terminal. Then, the digital cash data M6 in which the amount of money is changed is encrypted with the retail shop public-key Kbs with the digital cash management program P:

Cm6kbs=E(Kbs, M6)

and stored in the terminal.

Retail shop 38 which is willing to settle the stock account of products to manufacturer 40 makes the settlement using the same manner.

In the general trade system, retail shop 38 stocks products either from manufacturer 40 or the wholesaler placed between retail shop 38 and manufacturer 40 and sells the products to customer 36. Consequently, a trade form similar to the trade form between customer 36 and retail shop 38 is present between retail shop 38 and manufacturer 40.

Since the handling of the digital cash between retail shop 38 and manufacturer 40 is not basically different from the handling of digital cash between customer 36 and retail shop 38, an explanation is omitted for the sake of clarity.

In the embodiments 17 and 18, a configuration of a data copyright management system explained by using FIG. 4 is applied to actualize the digital cash system. Further, customer information is used and the secret-key to be used is altered in embodiment 17. The public-key and the private-key are used in embodiment 18.

However, as a system configuration for actualizing the digital cash system, the configuration of other copyright management systems such as any configuration of the data copyright management system shown in FIGS. 1, 2, 3 and 5 can be applied. Further, as a cryptosystem used in the case, any of the cryptosystems explained in embodiments 1 through 13 using the non-altered secret-key, the public-key and the private-key, a combination of the secret-key, public-key and the private-key, and complex keying can be applied.

Embodiment 19

In the video conference system, a television picture has been added to the conventional voice telephone set. Advanced video conference system shows a system in which a computer system is incorporated in the video conference system so that the quality of the voice and the picture are improved, and data can be handled simultaneously with the voice and the picture.

Under these circumstances, security against the violation of the user's privacy and the data leakage due to eavesdropping by persons other than the participants of the conference are protected by the cryptosystem using a secret-key.

However, since the conference content obtained by the participants themselves are decrypted, when participants themselves store the content of the conference and sometimes edit the content and further, use for secondary usage such as distribution to the persons other than the participants of the conference, the privacy of other participants of the video conference and data security-remains unprotected.

In particular, as the compression technology of the transmission data is advanced and the volume of the data storage medium increases, it is possible that all the content of the video conference is copied to the data storage medium or transmitted via a network.

In view of the circumstances, embodiment 19 is intended; when video conference participants perform secondary use, to secure the privacy of other participants and data security by using the aforementioned configuration of the data copyright management system.

This video conference data management system can be actualized, for example, by replacing database 1 in the data copyright management system configuration shown in FIG. 4 with a participant of the video conference, the first user terminal 4 with another participant of the video conference, and the second user terminal 5 with non-participant of the video conference.

Figure 9:
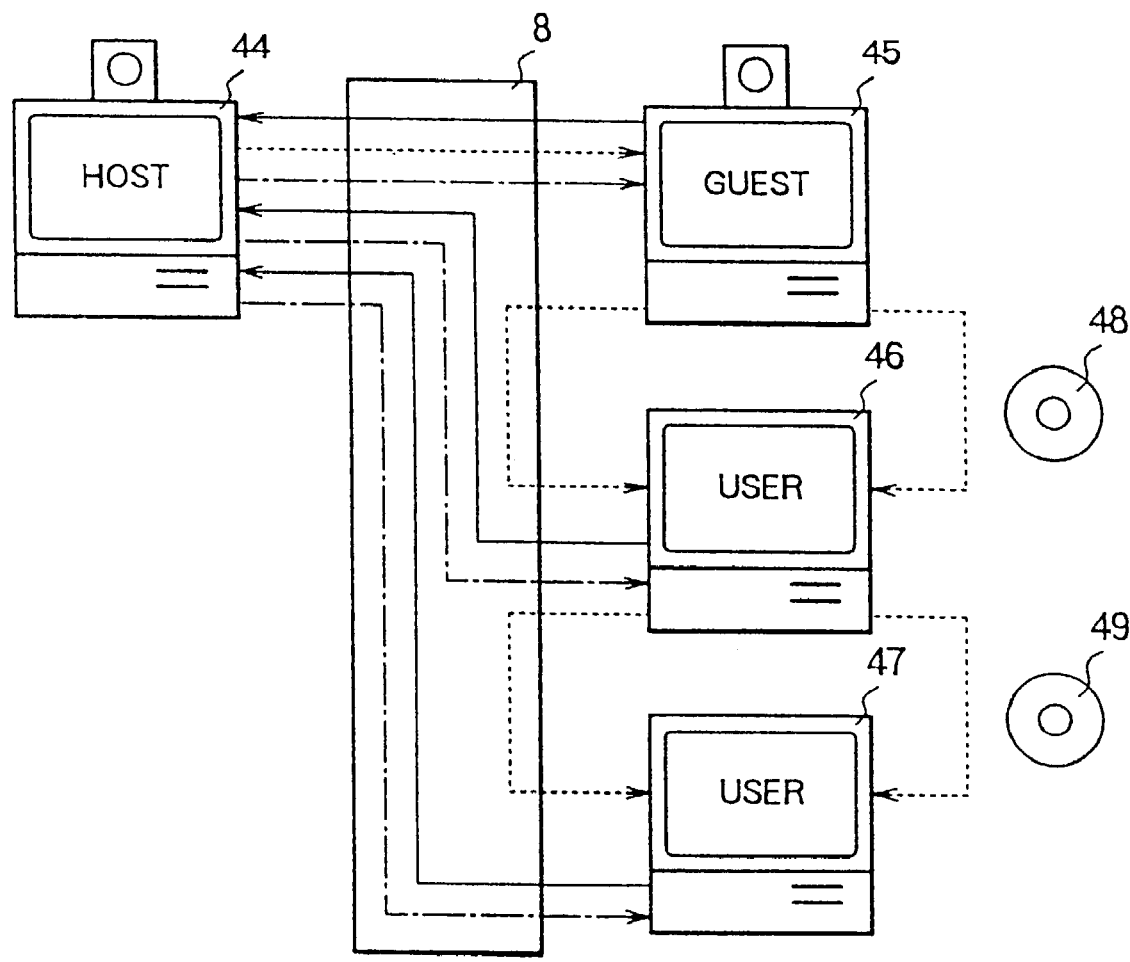
FIG. 9 illustrates a video conference system for embodiment 19 of the present invention.

Embodiment 19 will be explained by using FIG. 9. Referring to FIG. 9, reference numeral 44 represents a participant as a host of the video conference, 45 a participant of the video conference as a guest, 46 a non-participant of the video conference as a user, 47 a non-participant of the video conference as another user, 8 a communication network such as a public telephone line provided by the communication enterprise and a CA television line provided by the cable television enterprise or the like. Participant 44 of the video conference is connected to participant 45 of the video conference via communication network 8. Further, participant 45 of the video conference can be connected to non-participant 46 of the video conference, and non-participant 46 of the video conference to non-participant 47 of the video conference, via communication network 8. Reference numeral 48 represents a data recording medium.

Referring to FIG. 9, the broken line is a path of the encrypted video conference content, the solid line is a path requesting the crypt key from non-participants 46 and 47 of the television conference to participant of the television conference 44, and the one-dot chain line is a path of crypt keys from participant of the video conference 44 to participant of the video conference 45 and non-participants of the video conference 46 and 47.

In this embodiment, a video conference data management system is described here only for the protection for data security and privacy in case of video conference participant 44 to simplify the explanation. However, it is of course, possible to protect for data security and privacy of the video conference participant 45.

A video conference data management program P for encryption/decryption of the video conference data is previously distributed to video conference participant 45 and video conference non-participants 46 and 47, and is stored in each terminal. The video conference data management program P may be transferred whenever a crypt key is transferred.

In this embodiment, further, a first secret-key prepared by video conference participant 44, a second secret-key prepared by video conference participant 45 and a third secret-key prepared by video conference non-participant 46 are also used.

Video conference participant 44 and video conference participant 45 perform the video conference by transmitting audio, picture and data (referred to as video conference data on the whole) each other, using each terminal via communication network 8. Before the video conference, video conference participant 44 generates or selects the first secret-key Ks1 to transfer to video conference participant 45 prior to the start of the video conference.

Video conference participant 45 receives the first secret-key Ks1 and generates the second secret-key Ks2 by the first secret-key Ks1 using the video conference data management program P:

Ks2=P(Ks1).

The generated second secret-key Ks2 is stored in the terminal.

Participant 44 of the video conference encrypts the video conference data M0 with the first secret-key Ks1 in the video conference via communication network 8:

CmOks1=E(Ks1, MO)

and transfers the encrypted video conference data CmOks1 to video conference participant 45.

Participant 45 of the video conference who receives the video conference data CmOks1 encrypted by the first secret-key Ks1 decrypts the video conference data CmOks1 by the first secret-key Ks1:

M0=D(ks1, CmOks1)

and uses decrypted video conference data MO.

Further, the second secret-key Ks2 is generated based on the first secret-key Ks1 with the video conference data management program P:

Ks2=P(Ks1).

In the case where the decrypted video conference data M0 is stored in the terminal of participant 45 of the video conference, copied to data record medium 48, or transferred to the non-participant of the video conference via communication network 8, the data M is encrypted by the second secret-key Ks2 using the video conference data management program P:

Cmks2=E(Ks2, M).

The encrypted data Cmks2 is copied to record medium 48 or supplied to the non-participant of the video conference via communication network 8, together with the video conference data name or the video conference data number.

Non-participant 46 of the television conference who obtains the encrypted data CmKs2 makes a request to participant 44 for the secondary use of the video conference data M from the terminal by specifying the name or number of the video conference data.

Participant 44 of the video conference who receives the request for the second use of the data M finds out the first secret-key Ks1 according to the name or the number of the video conference data name or number to generate the second secret-key Ks2 based on the first secret-key Ks1:

Ks2=P(Ks1)

and supplies the generated second secret-key Ks2 to non-participant 46 of the video conference.

Non-participant 46 of video conference who receives the second secret-key Ks2, decrypts the encrypted data Cmks2 by the second secret-key Ks2 by using the television conference data management program P:

M=D(Ks2, Cmks2)

and then, uses decrypted video conference data M.

In the case where the video conference data M is stored in the terminal of non-participant 46 of the video conference, copied to record medium 49, or transmitted to non-participant 47 of the video conference, the video conference data M is encrypted by the second secret-key Ks2 using the video conference data management program P:

Cmks2=E(Ks2, M).

The third secret-key Ks3 may be generated on the basis of the second secret-key Ks2 with the television conference data management program P:

Ks3=P(Ks2)

The data M can be encrypted with the video conference data management program P by this generated third secret-key Ks3:

Cmks3=E(Ks3, M).

In embodiment 19 described above, the configuration of the data copyright management system which is explained by using FIG. 4 for realizing the video conference data management system is applied and alter the secret-key which has been used.

However, as a configuration of a system for realizing the video conference data system, other system configuration, for example, any of system configurations shown in FIGS. 1, 2, 3, 4 and 5 can be applied. Further, as cryptosystem used in such a case, the non-altered secret-key, the public-key and the private-key, a combination of the secret-key, the public-key and the private-key, and the complex keying which is explained from embodiment 1 to 13 can be applied.

Further, in this explanation, it is supposed that the participant of the video conference as a guest stores and uses the video conference data, copies the data on the record medium and transfers the data via the communication network. It is also possible to limit these actions by disusing the crypt key used in the encryption process.

Embodiment 20

As described above, each user who uses the system of the present invention must previously be entered in a database system, and when entered in the system, software for database is supplied to the user.

Because the software includes not only normal communication software such as a data communication protocol but also a program for decrypting a copyright control program by a first crypt key, it needs to be protected.

In the case of the present invention, a first crypt key K1, a second crypt key K2, and a copyright control program P are transferred to each user in order to use data M. Therefore, each user must keep these keys and the program. Further, the copyright information label, user information, the public-key and private-key in the public-key cryptosystem and the program containing algorithm for generating the secret-key are kept when needed.

For keeping them, it is the simplest to use a flexible disk. However, in the flexible disk it is easy to lose or alter data.

A hard disk drive is also unstable against losing or altering data though it is more stable than the flexible disk.

Recently, IC cards have become available in which an IC element is sealed in a card-like package. Particularly, standardization of a PC card with a microprocessor sealed in it has progressed as a PCMCIA (Personal Computer Memory Card International Association) card or JEIDA card.

Figure 10:
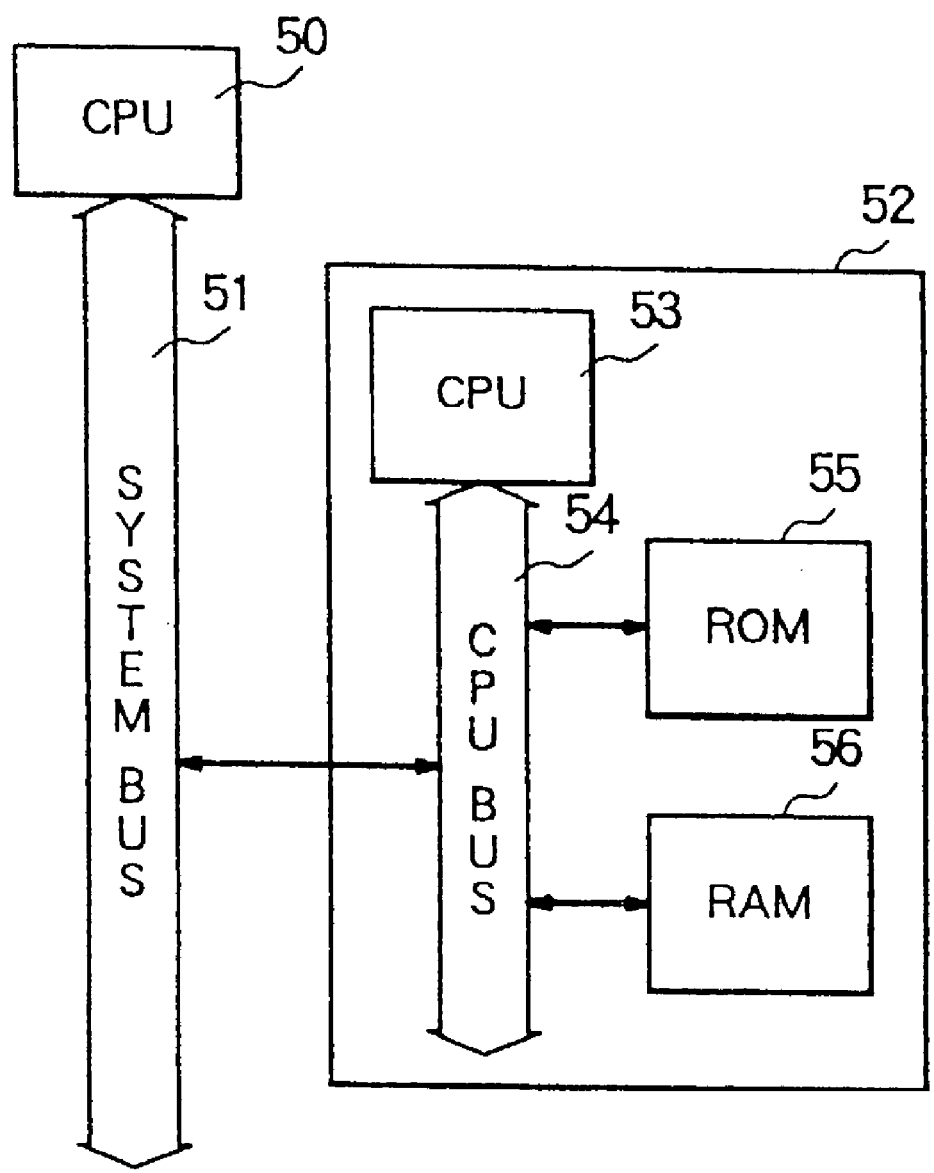
FIG. 10 illustrates an embodiment of a user terminal used for the data copyright management system of the present invention.

FIG. 10 shows an embodiment of the database copyright management system of the present invention constituted by using the PC card. In FIG. 10, reference numeral 50 represents a microprocessor of a user terminal, 51 represents a system bus, and 52 represents a PC card in which a PC card microprocessor 53, read-only memory 55, and random-access memory 56 are sealed. System bus 51, microprocessor 53, read-only memory 55, random-access memory 56 are connected with each other by PC card microprocessor bus 54.

Read-only memory 55 stores fixed information such as database, software and user data as a database. Read-only memory 55 also stores a first crypt key, a second crypt key, and a copyright control program supplied from key control center 9 or a copyright management center. Because data is also written in read-only memory 55, it is the simplest to use an EEPROM for memory 55.

As previously described, because data, the crypt key, and the copyright control program can be encrypted and supplied to the users, in order to use data it is necessary to decrypt these crypt key, copyright control program and the data.

To perform the above operations, microprocessor 50 of the user terminal uses the software, crypt key and copyright control program stored in read-only memory 55 of PC card 52.

In this case, however, there is a risk that these data information may be used illegally because they are transferred to the user terminal. To avoid the risk, it is necessary to make microprocessor 55 in PC card 52 perform every operation by using random-access memory 56 through CPU bus 54 and transfer results only to the user terminal for various types of utilization.

It is understood that particular embodiments described herein should not limit the present invention thereby. This invention can be practiced in connection with any data management system. For example, when the PC card is used, a different unit can be used as the user terminal. It is also possible to use a board or external unit having the above functions in addition to the PC card.

Thus, a database copyright control system has been described, which is applicable to multimedia system.

The invention claimed is:

1. A method, comprising:
sending a user access request for content from a computing device to a remote computer system;
responsive to the user access request, receiving, at the computing device, a first key and an encrypted content control program from the remote computer system;
decrypting the content control program using a secret key;
decrypting the content on the computing device using the first key and the content control program;
permitting a user to use the decrypted content within the computing device; and
after use of the decrypted content within the computing device and in response to the user initiating a transfer of the content external to the computing device, re-encrypting the decrypted content prior to the transfer, wherein said re-encrypting is performed using a second key, the second key being distinct from the secret key, and the content control program.

2. The method of claim 1, wherein the content includes copyrighted data.

3. The method of claim 1, wherein said receiving further includes receiving the second key.

4. The method of claim 3, wherein the second key is received responsive to a subsequent request to store or transfer the content external to the computing device.

5. The method of claim 1, wherein said decrypting the encrypted content control program using the secret key includes decrypting the encrypted content control program using a third key.

6. The method of claim 5, wherein the third key is generated by a key control program running on the computing device.

7. The method of claim 6, wherein the third key is generated by the key control program in response to input identifying the user of the content on the computing device.

8. The method of claim 1, wherein, subsequent to the transfer, instances of the first and second keys that have been used for decryption and encryption operations are no longer usable to decrypt or re-encrypt the content.

9. The method of claim 1, wherein the remote computer system includes:
a database storing content; and
a key management center.

10. The method of claim 1, wherein the content includes edited copyrighted data.

11. The method of claim 8, further comprising:
the computing device requesting reuse of the content;
responsive to the reuse request, the computing device receiving another instance of the second key;
the computing device decrypting the content using the other instance of the second key; and
the computing device reusing the content.

12. The method of claim 1, further comprising, before the transfer, adding, to the content, unencrypted information corresponding to the user of the computing device.

13. The method of claim 3, wherein said receiving the first and second keys includes receiving the first and second keys as encrypted keys.

14. The method of claim 13, wherein the user access request includes first and second public keys generated by the computing device, wherein the first and second public keys correspond to first and second private keys, respectively, wherein the first and second private keys are also generated by the computing device, and wherein the first and second private keys are usable to decrypt the first and second keys, respectively.

15. The method of claim 1, wherein the content control program is executable on the computing device to generate the second key.

16. The method of claim 15, wherein the content control program is executable on the computing device to use the first key to generate the second key.

17. The method of claim 16, wherein the content control program is executable on the computing device to also use information identifying the user of the content on the computing device in order to generate the second key.

18. The method of claim 15, wherein the content control program is executable on the computing device to use information identifying the user of the content on the computing device in order to generate the second key.

19. An apparatus, comprising:
a processor; and
memory, coupled to the processor, having program instructions stored thereon that are executable by the apparatus to cause the apparatus to perform operations including:
sending, to a remote computer system, a request for content;
responsive to the request, receiving a first key and an encrypted content control program from the remote computer system;
decrypting the encrypted content control program using a secret key;
decrypting the content using the first key and the decrypted content control program;
permitting use of the decrypted content within the apparatus; and
after use of the decrypted content within the apparatus and in response to initiation of a transfer of the decrypted content external to the apparatus, re-encrypting the decrypted content prior to the transfer, wherein the re-encrypting is performed using a second key, the second key being distinct from the secret key, and the decrypted content control program.

20. The apparatus of claim 19, wherein the operations are performed by a data management control program that uses a protected area of the memory that is inaccessible by users of the apparatus.

21. The apparatus of claim 19, wherein the operations further comprise:

generating the second key.

22. The apparatus of claim 19, wherein the decrypting the encrypted content control program using the secret key includes decrypting the encrypted content control program using a third key.

23. The apparatus of claim 19, wherein the operations further comprise:

receiving the second key;

wherein the first and second keys are received from a management center that is configured to distribute content in response to user requests.

24. The apparatus of claim 19, wherein the operations further comprise:

causing display of the decrypted content at the apparatus.

25. The apparatus of claim 19, wherein the permitting use of the decrypted content includes permitting editing of the decrypted content.

* * * * *

UNITED STATES PATENT AND TRADEMARK OFFICE
CERTIFICATE OF CORRECTION

PATENT NO.         : 8,352,373 B2
APPLICATION NO.    : 10/352078
DATED              : January 8, 2013
INVENTOR(S)        : Saito It is certified that error appears in the above-identified patent and that said Letters Patent is hereby corrected as shown below:

On Title Page 4, in Item (56), under "FOREIGN PATENT DOCUMENTS", in Column 1, Line 16, delete "15327693" and insert -- 5327693 --, therefor.

On Title Page 4, in Item (56), under "OTHER PUBLICATIONS", in Column 1, Line 17, delete "Erectrical" and insert -- Electrical --, therefor.

On Title Page 4, in Item (56), under "OTHER PUBLICATIONS", in Column 1, Line 19, delete "Confernece" and insert -- Conference --, therefor.

On Title Page 4, in Item (56), under "OTHER PUBLICATIONS", in Column 2, Line 9, delete "fied" and insert -- filed --, therefor.

In the Specification

In Column 13, Line 26, delete "due to" and insert -- clue to --, therefor.

In Column 13, Line 41, delete "secret-key." and insert -- secret-key --, therefor.

In Column 14, Line 25, delete "Ic1" and insert -- Icn-1 --, therefor.

In Column 23, Line 13, delete "name," and insert -- name --, therefor.

In Column 26, Line 16, delete "Ks2, third secret-key Ks3," and insert -- Ks02, third secret-key Ks03, --, therefor.

In Column 29, Line 23, delete "second," and insert -- second --, therefor.

In Column 30, Line 12, delete "Ks6 P3(Ks3);" and insert -- Ks6=P3(Ks3); --, therefor.

Signed and Sealed this
Twenty-ninth Day of October, 2013

Teresa Stanek Rea
*Deputy Director of the United States Patent and Trademark Office*

In Column 30, Line 28, delete "Cmks4)" and insert -- Cm4ks4) --, therefor.

In Column 32, Line 24, delete "A3...," and insert -- A3,..., --, therefor.

In Column 32, Line 37, delete ",; third," and insert -- ; third, --, therefor.

In Column 32, Line 40, delete "B3,..." and insert -- B3,..., --, therefor.

In Column 32, Line 51, delete "to a" and insert -- of a --, therefor.

In Column 37, Line 35, delete "preliminary" and insert -- preliminarily --, therefor.

In Column 37, Line 49, delete "CmOks1" and insert -- Cm0ks1 --, therefor.

In Column 37, Line 50, delete "CmOks1" and insert -- Cm0ks1 --, therefor.

In Column 37, Line 55, delete "preliminary" and insert -- preliminarily --, therefor.

In Column 38, Line 2, delete "CmOks1" and insert -- Cm0ks1 --, therefor.

In Column 38, Line 10, delete "CmOks1" and insert -- Cm0ks1 --, therefor.

In Column 38, Line 12, delete "MO=D(Ks1, CmOks1)" and insert -- M0=D(Ks1, Cm0ks1) --, therefor.

In Column 38, Line 14, delete "MO" and insert -- M0 --, therefor.

In Column 38, Line 19, delete "CmOKs2=E(Ks2, MO)." and insert -- Cm0Ks2=E(Ks2, M0). --, therefor.

In Column 38, Line 22, delete "CmOks2" and insert -- Cm0ks2 --, therefor.

In Column 38, Line 25, delete "MO=D(Ks2, CmOks2)" and insert -- M0=D(Ks2, Cm0ks2) --, therefor.

In Column 39, Line 66, delete "checques" and insert -- cheques --, therefor.

In Column 40, Line 25, delete "preliminary" and insert -- preliminarily --, therefor.

In Column 40, Line 28, delete "preliminary" and insert -- preliminarily --, therefor.

In Column 40, Line 35, delete "Mo" and insert -- M0 --, therefor.

In Column 40, Line 36, delete "preliminary" and insert -- preliminarily --, therefor.

CERTIFICATE OF CORRECTION (continued)
U.S. Pat. No. 8,352,373 B2

In Column 40, Line 39, delete "MO)" and insert -- M0) --, therefor.

In Column 40, Line 40, delete "CmOkbc" and insert -- Cm0kbc --, therefor.

In Column 40, Line 43, delete "CmOkbc" and insert -- Cm0kbc --, therefor.

In Column 40, Line 49, delete "M2(=MO+M1)" and insert -- M2=(M0+M1) --, therefor.

In Column 40, Lines 63-64, delete "preliminary" and insert -- preliminarily --, therefor.

In Column 43, Line 10, delete "CmOks1=E(Ks1, MO)" and
insert -- Cm0ks1=E(Ks1, M0) --, therefor.

In Column 43, Line 11, delete "CmOks1" and insert -- Cm0ksl --, therefor.

In Column 43, Line 14, delete "CmOks1" and insert -- Cm0ks1 --, therefor.

In Column 43, Line 15, delete "CmOks1" and insert -- Cm0ks1 --, therefor.

In Column 43, Line 17, delete "CmOks1)" and insert -- Cm0ks1) --, therefor.

In Column 43, Line 18, delete "MO." and insert -- M0. --, therefor.

In Column 44, Line 60, delete "database," and insert -- database --, therefor.